(12) United States Patent
Kim et al.

(10) Patent No.: US 12,192,838 B2
(45) Date of Patent: Jan. 7, 2025

(54) METHOD AND APPARATUS FOR RADIO RESOURCE MANAGEMENT IN WIRELESS COMMUNICATION SYSTEM

(71) Applicant: LG Electronics Inc., Seoul (KR)

(72) Inventors: Hongsuk Kim, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 17/608,609

(22) PCT Filed: May 4, 2020

(86) PCT No.: PCT/KR2020/005884
§ 371 (c)(1),
(2) Date: Nov. 3, 2021

(87) PCT Pub. No.: WO2020/226392
PCT Pub. Date: Nov. 12, 2020

(65) Prior Publication Data
US 2022/0217594 A1    Jul. 7, 2022

(30) Foreign Application Priority Data
May 3, 2019    (KR) .................. 10-2019-0052175

(51) Int. Cl.
*H04W 36/00*    (2009.01)
*H04W 36/08*    (2009.01)
*H04W 36/38*    (2009.01)

(52) U.S. Cl.
CPC ....... *H04W 36/0085* (2018.08); *H04W 36/08* (2013.01); *H04W 36/38* (2013.01)

(58) Field of Classification Search
None
See application file for complete search history.

(56) References Cited

U.S. PATENT DOCUMENTS

2015/0117399 A1    4/2015  Yang et al.
2020/0154333 A1*   5/2020  Paladugu ........... H04B 7/18506

FOREIGN PATENT DOCUMENTS

CN    101682576    3/2010
CN    105682162    6/2016
(Continued)

OTHER PUBLICATIONS

3GPP TS 36.300 vi5.5.0 , Mar. 2019, Release 15 (Year: 2019).*
(Continued)

*Primary Examiner* — Pamit Kaur
(74) *Attorney, Agent, or Firm* — Fish & Richardson P.C.

(57) ABSTRACT

The present disclosure relates to a radio resource management (RRM) in wireless communications. According to an embodiment of the present disclosure, a method performed by a wireless device in a wireless communication system comprises: receiving a measurement configuration from a source cell; initiating a dual active protocol stack (DAPS) mobility from the source cell to a target cell; detecting a failure of the DAPS mobility; after detecting the failure of the DAPS mobility: transmitting information for the failure of the DAPS mobility to the source cell; and performing a radio resource management (RRM) measurement on one or more neighbor cells based on the measurement configuration received from the source cell.

13 Claims, 20 Drawing Sheets

(56) References Cited

FOREIGN PATENT DOCUMENTS

WO    WO2008/156895    12/2008
WO    WO 2009084998    7/2009

OTHER PUBLICATIONS

Mobility Failure REcovery in NR by MediaTek, Apr. 2019 (Year: 2019).*
RLF Handling during MBB HO by Qualcomm (Year: 2019).*
MediaTek Inc., "Mobility Failure Recovery in NR," R2-1903244, Revision of R2-1900162, Presented at 3GPP TSG-RAN WG2 Meeting #105bis, Xi'an, China, Apr. 8-12, 2019, 7 pages.
Qualcomm Incorporated, "Control Plane handling and procedures to support Make-Before-Break (MBB) HO," R2-1903643, Revision of R2-1900358, Presented at 3GPP TSG-RAN WG2 Meeting #105bis, Xi'an, China, Apr. 8-12, 2019, 6 pages.
Qualcomm Incorporated, "RLF handling during MBB HO," R2-1903652, Revision of R2-1900366, Presented at 3GPP TSG-RAN WG2 Meeting #105bis, Xi'an, China, Apr. 8-12, 2019, 4 pages.
Qualcomm Incorporated, "User Plane changes to minimize the mobility interruption during Make-Before-Break (MBB) HO," R2-1903645, Revision of R2-1900360, 3GPP TSG-RAN WG2 Meeting #105bis, Xi'an, China, Apr. 8-12, 2019, 6 pages.
3GPP TS 36.300, V15.5.0, Mar. 2019, 3rd Generation Partnership Project Technical Specification Group Radio Access Network, Evolved Universal Terrestrial Radio Access (E-ETRA) and Evolved Universal Terrestrial Radio Access Network (E-UTRAN); Overall description; Stage 2 (Release 15), Mar. 2019, 363 pages.
3GPP TS 36.331 V15.5.1, Apr. 2019, 3rd Generation Partnership Project Technical Specification Group Radio Access Network, (Release 15), Apr. 2019, 948 pages.
Extended European Search Report in European Appln. No. 20802160.0, mailed on Dec. 20, 2022, 14 pages.
Office Action in Chinese Appln. No. 202080038893.2, mailed on Apr. 27, 2023, 15 pages (with English Translation).

* cited by examiner

METHOD AND APPARATUS FOR RADIO RESOURCE MANAGEMENT IN WIRELESS COMMUNICATION SYSTEM

CROSS-REFERENCE TO RELATED APPLICATIONS

This application is a National Stage application under 35 U.S.C. § 371 of International Application No. PCT/KR2020/005884, filed on May 4, 2020, which claims the benefit of Korean Patent Application No. 10-2019-0052175, filed on May 3, 2019. The disclosures of the prior applications are incorporated by reference in their entirety.

BACKGROUND OF THE DISCLOSURE

Field of the Disclosure

The present disclosure relates to a radio resource management (RRM) in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, RRM measurement may be performed to determine whether to perform a mobility. For example, a UE may perform the RRM measurement to obtain a measurement result comprising RSRP/RSRQ for neighbor cell(s), and report the measurement result to a serving cell. The serving cell may response by transmitting mobility command(s) for one or more target cells to the UE, and the UE may perform a mobility to one of the target cells based on a corresponding mobility command.

As stated above, the RRM measurement is essential for performing a mobility. Therefore, if the RRM measurement is delayed due to some reasons, the mobility to a target cell may also be delayed, which may cause service quality degradation.

SUMMARY OF THE DISCLOSURE

Technical Problem

An aspect of the present disclosure is to provide method and apparatus for RRM in a wireless communication system.

Another aspect of the present disclosure is to provide method and apparatus for RRM during a mobility procedure in a wireless communication system.

Another aspect of the present disclosure is to provide method and apparatus for RRM during a DAPS mobility procedure in a wireless communication system.

Another aspect of the present disclosure is to provide method and apparatus for handling configurations for RRM during a DAPS mobility procedure in a wireless communication system.

Technical Solution

According to an embodiment of the present disclosure, a method performed by a wireless device in a wireless communication system comprises: receiving a measurement configuration from a source cell; initiating a dual active protocol stack (DAPS) mobility from the source cell to a target cell; detecting a failure of the DAPS mobility; after detecting the failure of the DAPS mobility: transmitting information for the failure of the DAPS mobility to the source cell; and performing a radio resource management (RRM) measurement on one or more neighbor cells based on the measurement configuration received from the source cell.

According to an embodiment of the present disclosure, a wireless device in a wireless communication system comprises: a transceiver; a memory; and at least one processor operatively coupled to the transceiver and the memory, and configured to: control the transceiver to receive a measurement configuration from a source cell, initiate a dual active protocol stack (DAPS) mobility from the source cell to a target cell, detect a failure of the DAPS mobility, and after detecting the failure of the DAPS mobility: control the transceiver to transmit information for the failure of the DAPS mobility to the source cell, and perform a radio resource management (RRM) measurement on one or more neighbor cells based on the measurement configuration received from the source cell.

According to an embodiment of the present disclosure, a processor for a wireless device in a wireless communication system, wherein the processor is configured to control the wireless device to perform operations comprising: receiving a measurement configuration from a source cell; initiating a dual active protocol stack (DAPS) mobility from the source cell to a target cell; detecting a failure of the DAPS mobility; after detecting the failure of the DAPS mobility: transmitting information for the failure of the DAPS mobility to the source cell; and performing a radio resource management (RRM) measurement on one or more neighbor cells based on the measurement configuration received from the source cell.

Advantageous Effect

The present disclosure can have various advantageous effects.

For example, the UE may perform an RRM measurement on one or more neighbor cells after a handover failure based on a source cell configuration so that a new handover can be initiated quickly. Since performing RRM of a source cell after the handover failure may prevent RRC re-establishment procedure and the UE may be able to keep sending data transmission to the source cell, interruption time can be further reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
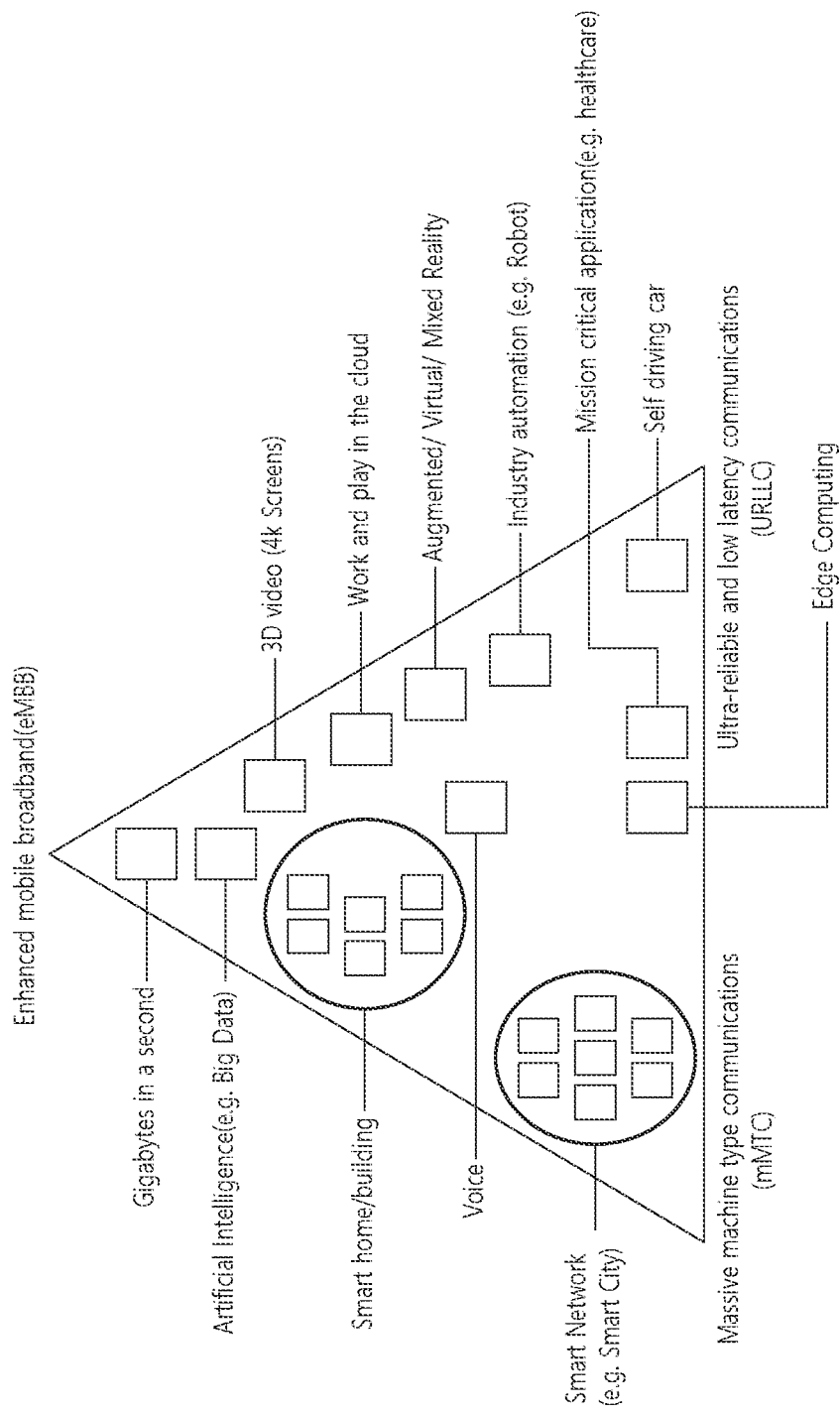
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying RRC reconfiguration parameters in the mobility command of the target cell. Further, RRC reconfiguration and RRC connection reconfiguration may be used interchangeably.

'Conditional mobility' refers to a mobility that is performed to a target cell which satisfies a triggering condition among a plurality of candidate target cells. Throughout the disclosure, performing a conditional mobility to a target cell may refer to applying a conditional mobility command of a target cell which satisfies a mobility condition for the target cell among a plurality of candidate target cells or applying RRC reconfiguration parameters in the conditional mobility command of the target cell which satisfies a mobility condition for the target cell among the plurality of candidate target cells.

'Mobility condition for a target cell' refers to a triggering condition for a mobility to the target cell. That is, the mobility condition for a target cell refers to a condition that should be satisfied for triggering a mobility to the target cell. Mobility condition may comprise at least one of an event, time-to-trigger (TTT), offset value, or threshold value(s). The mobility condition for an event may be satisfied if an entering condition for the event is satisfied for at least the TTT. For example, the entering condition for event A3 may be satisfied if a signal quality for a target cell is better than that for a source cell more than or equal to the offset value. For another example, the entering condition for event A4 may be satisfied if a signal quality for a target cell is better than a neighbor cell threshold. For another example, the entering condition for event A5 may be satisfied if a signal quality for a target cell is better than a neighbor cell threshold and a signal quality for a source cell is lower than a serving cell threshold.

'Report condition of the RRM measurement' may be a condition that should be satisfied for triggering (a transmission of) a measurement report comprising a result of the RRM measurement. The report condition may be similar to a mobility condition. For example, the report condition may comprise at least one of an event, TTT, offset value, or threshold value(s). The report condition for an event may be satisfied if an entering condition for the event is satisfied for at least the TTT. For example, the entering condition for event A3 may be satisfied if a signal quality for a neighbor cell is better than that for a source cell more than or equal to the offset value. For another example, the entering condition for event A4 may be satisfied if a signal quality for a neighbor cell is better than a neighbor cell threshold. For another example, the entering condition for event A5 may be satisfied if a signal quality for a neighbor cell is better than a neighbor cell threshold and a signal quality for a source cell is lower than a serving cell threshold.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925

MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
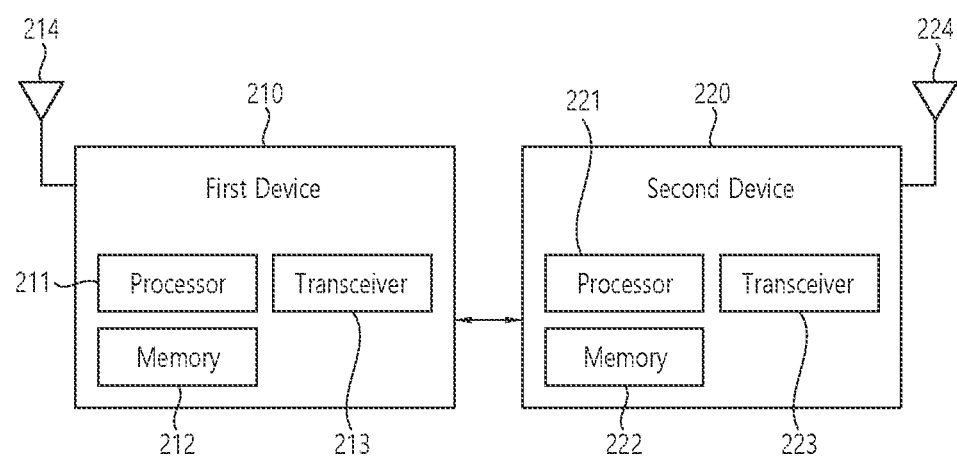
FIG. 2 shows an example of a wireless communication system to which the technical features of the present disclosure can be applied.

FIG. 2 shows an example of a wireless communication system to which the technical features of the present disclosure can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
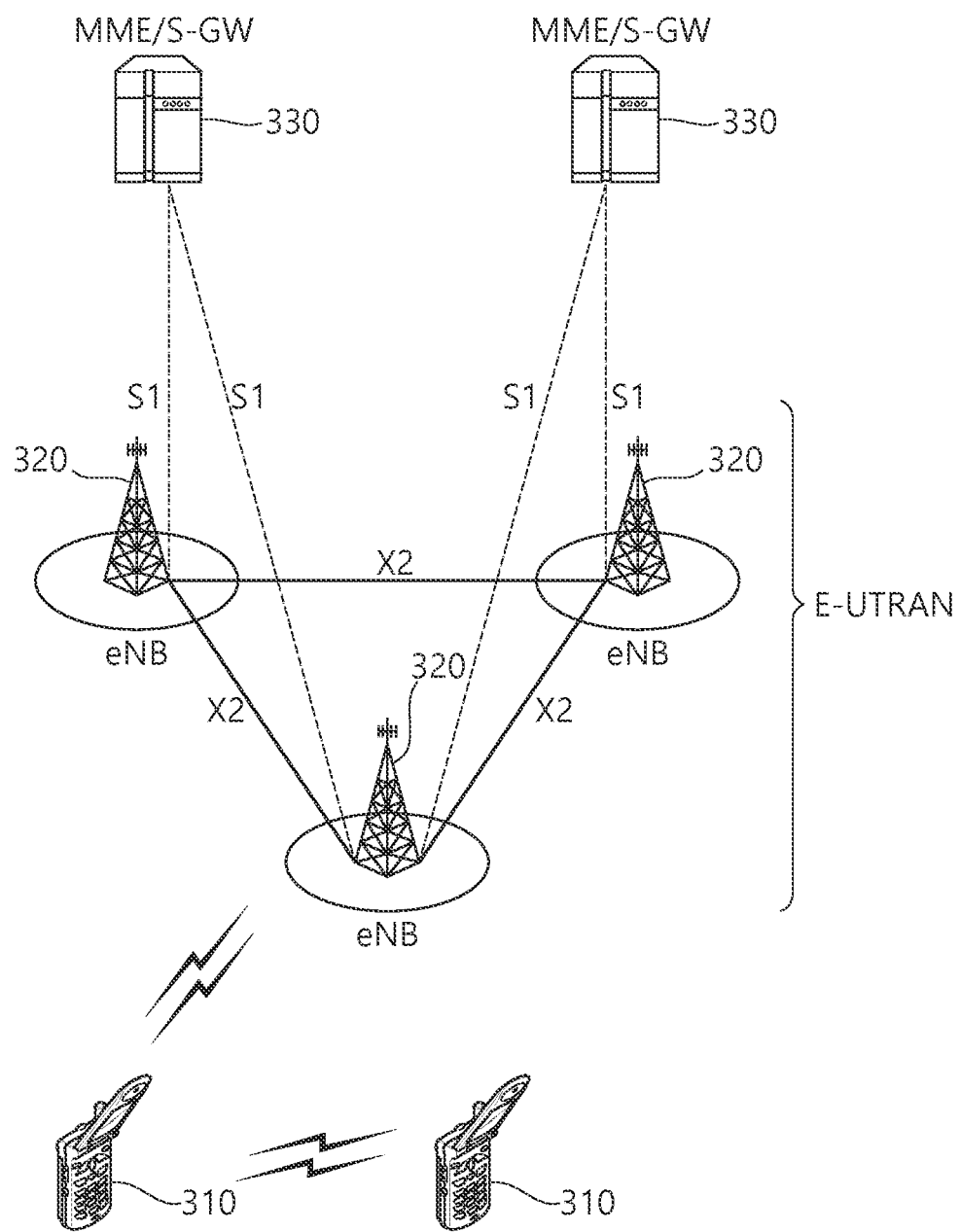
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
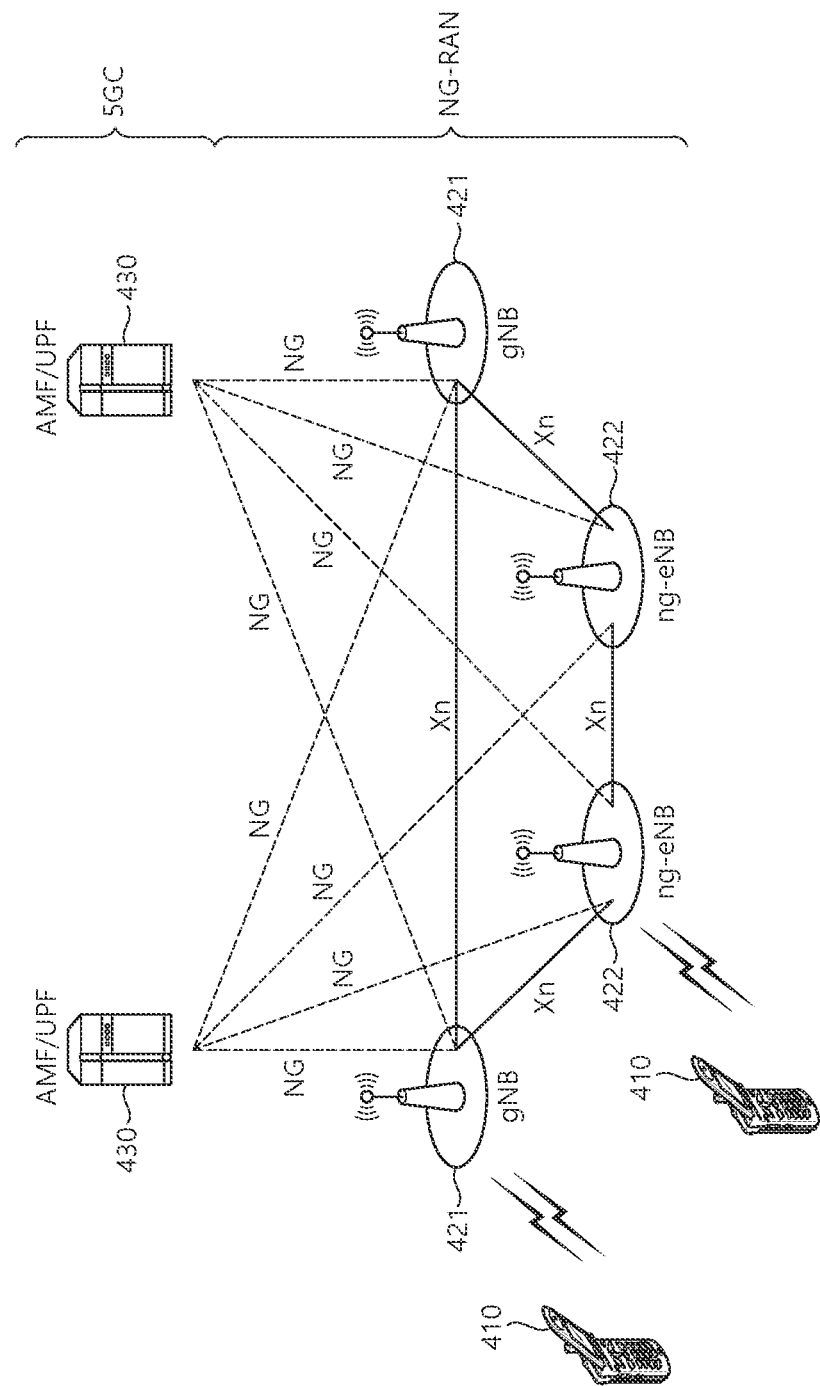
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
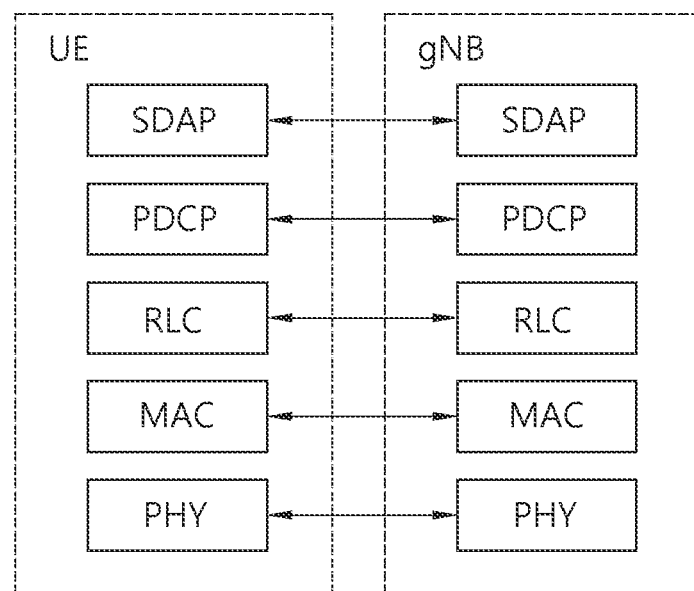
FIG. 5 shows a block diagram of a user plane protocol stack to which the technical features of the present disclosure can be applied.
Figure 6:
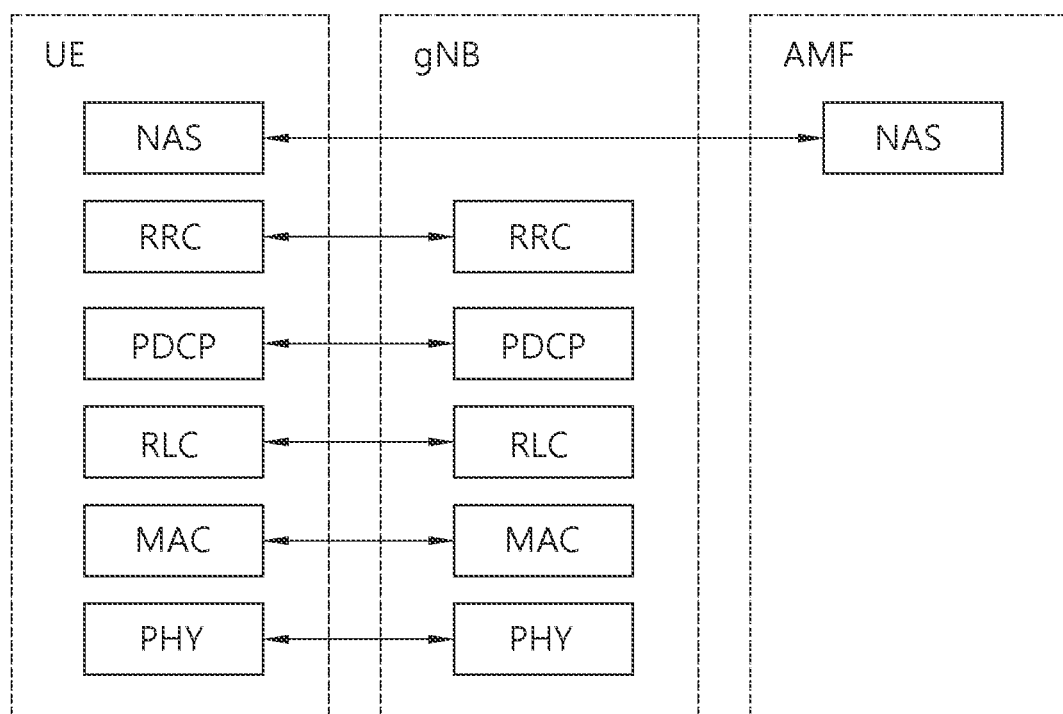
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
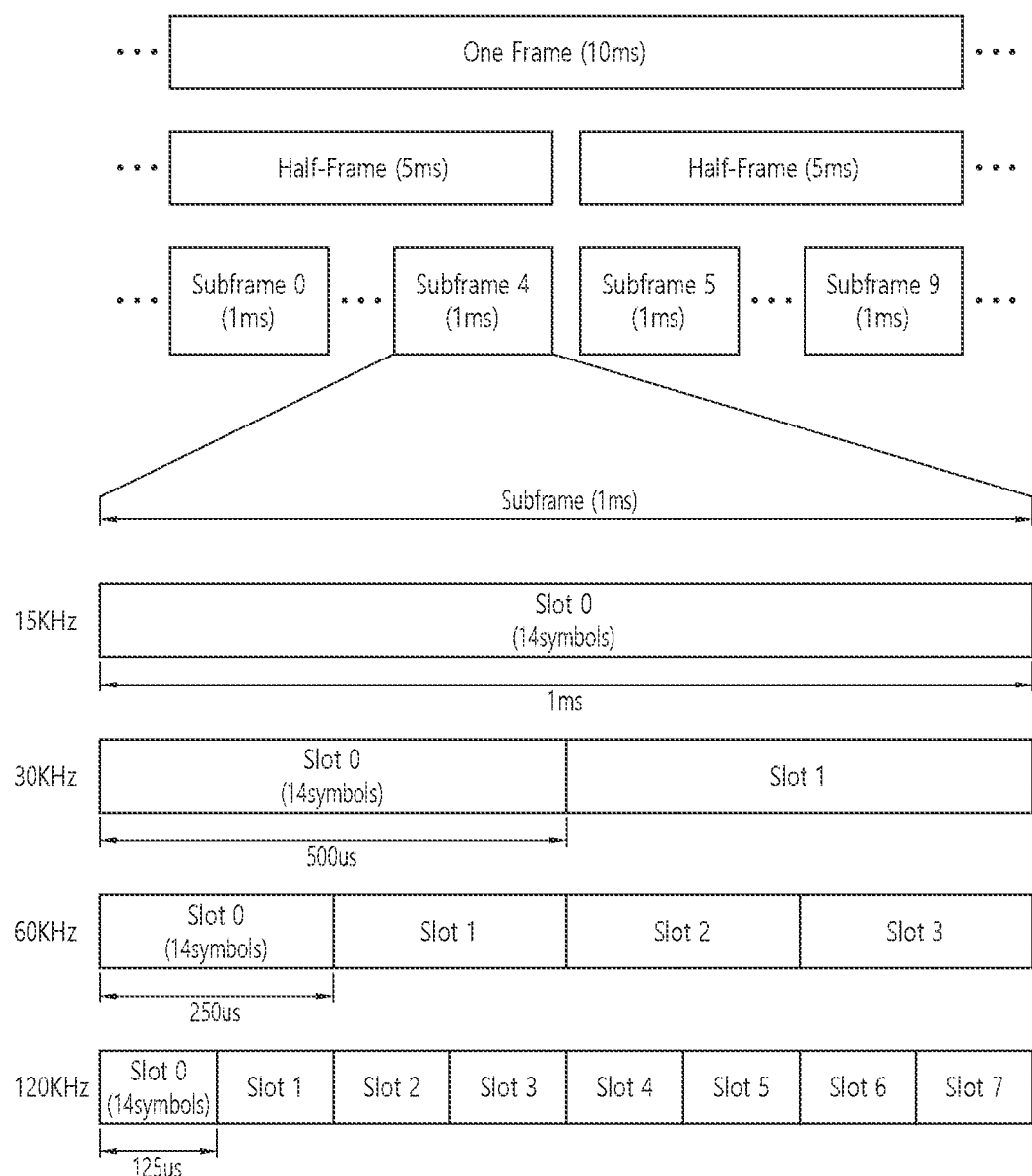
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz. The following table shows the number of OFDM symbols per slot, the number of slots per frame, and the number of slots per for the normal CP, according to the subcarrier spacing $\Delta f=2^u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2^u*15$ kHz.

TABLE 4

| U | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid,x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
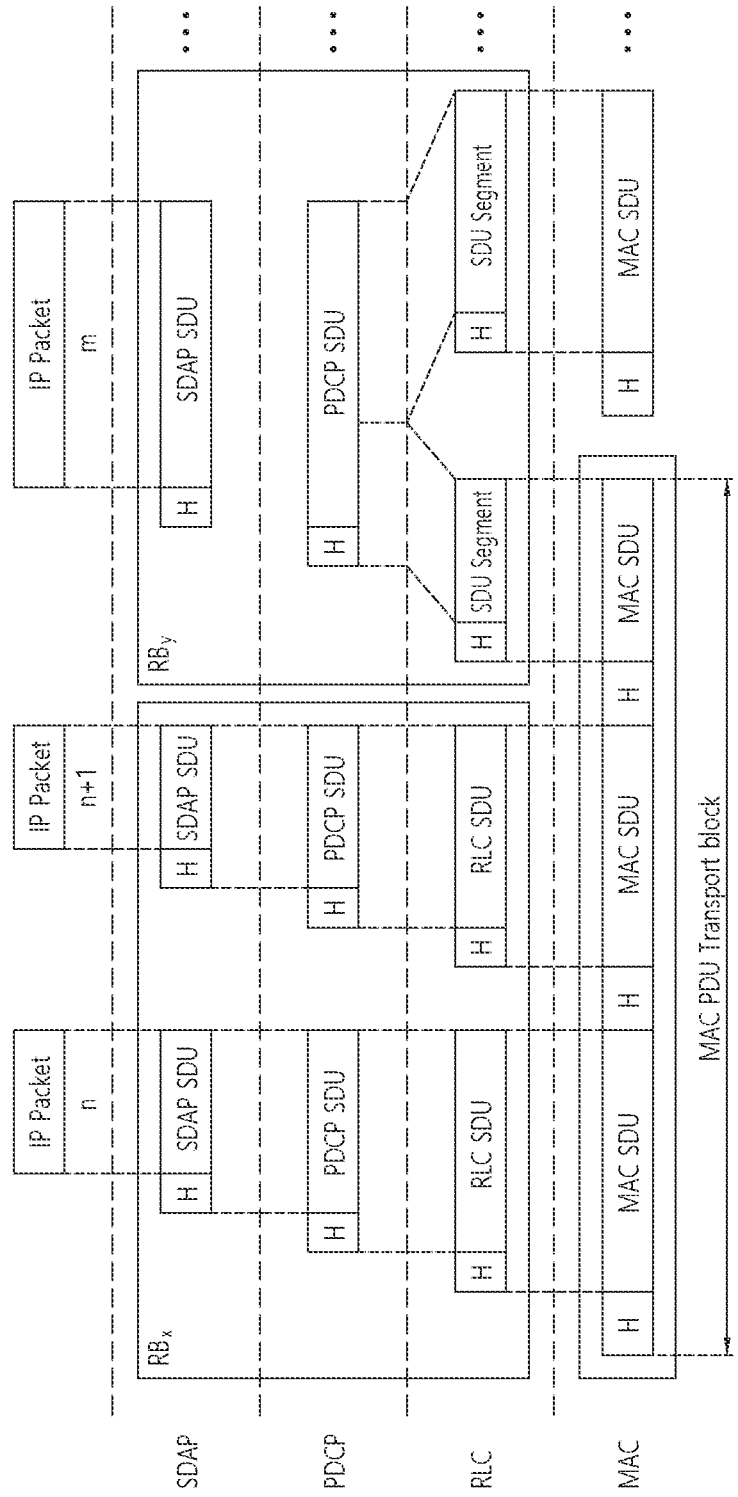
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

In various embodiments, timer value(s) as described in table 5 to 8 may be used.

TABLE 5

| Timer | Start | Stop | At expiry |
|---|---|---|---|
| T300 | Transmission of RRCConnectionRequest or RRCConnectionResumeRequest or RRCEarlyDataRequest | Reception of RRCConnectionSetup, RRCConnectionReject or RRCConnectionResume or RRCEarlyDataComplete or RRCConnectionRelease for UP-EDT, cell re-selection and upon abortion of connection establishment by upper layers | Perform RRC connection establishment procedure |

TABLE 6

| Timer | Start | Stop | At expiry |
|---|---|---|---|
| T301 | Transmission of RRCConnectionRe-estabilshmentRequest | Reception of RRCConnectionRe-establishment or RRCConnectionRe-establishmentReject message as well as when the selected cell becomes unsuitable | Go to RRC_IDLE |
| T304 | Reception of RRCConnectionReconfiguration message including the MobilityControl Info or reception of MobilityFromEUTRACommand message including CellChangeOrder | Criterion for successful completion of handover within E-UTRA, handover to E-UTRA or cell change order is met (the criterion is specified in the target RAT in case of inter-RAT) | In case of cell change order from E-UTRA or intra E-UTRA handover, initiate the RRC connection re-establishment procedure; In case of handover to E-UTRA, perform the actions defined in the specifications applicable for the source RAT. |

TABLE 7

| Timer | Start | Stop | At expiry |
|---|---|---|---|
| T311 | Upon initiating the RRC connection re-establishment procedure | Selection of a suitable E-UTRA cell or a cell using another RAT. | Enter RRC_IDLE |
| T310 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated and the UE is not a NB-IoT UE that supports RRC connection re-establishment for the Control Plane CIoT EPS optimisation: go to RRC_IDLE else: initiate the connection re-establishment procedure |

TABLE 8

| Timer | Start | Stop | At expiry |
|---|---|---|---|
| T312 | Upon triggering a measurement report for a measurement identity for which T312 has been configured, while T310 is running | Upon receiving N311 consecutive in-sync indications from lower layers, upon triggering the handover procedure, upon initiating the connection re-establishment procedure, and upon the expiry of T310 | If security is not activated: go to RRC_IDLE else: initiate the connection re-establishment procedure |

Figure 9:
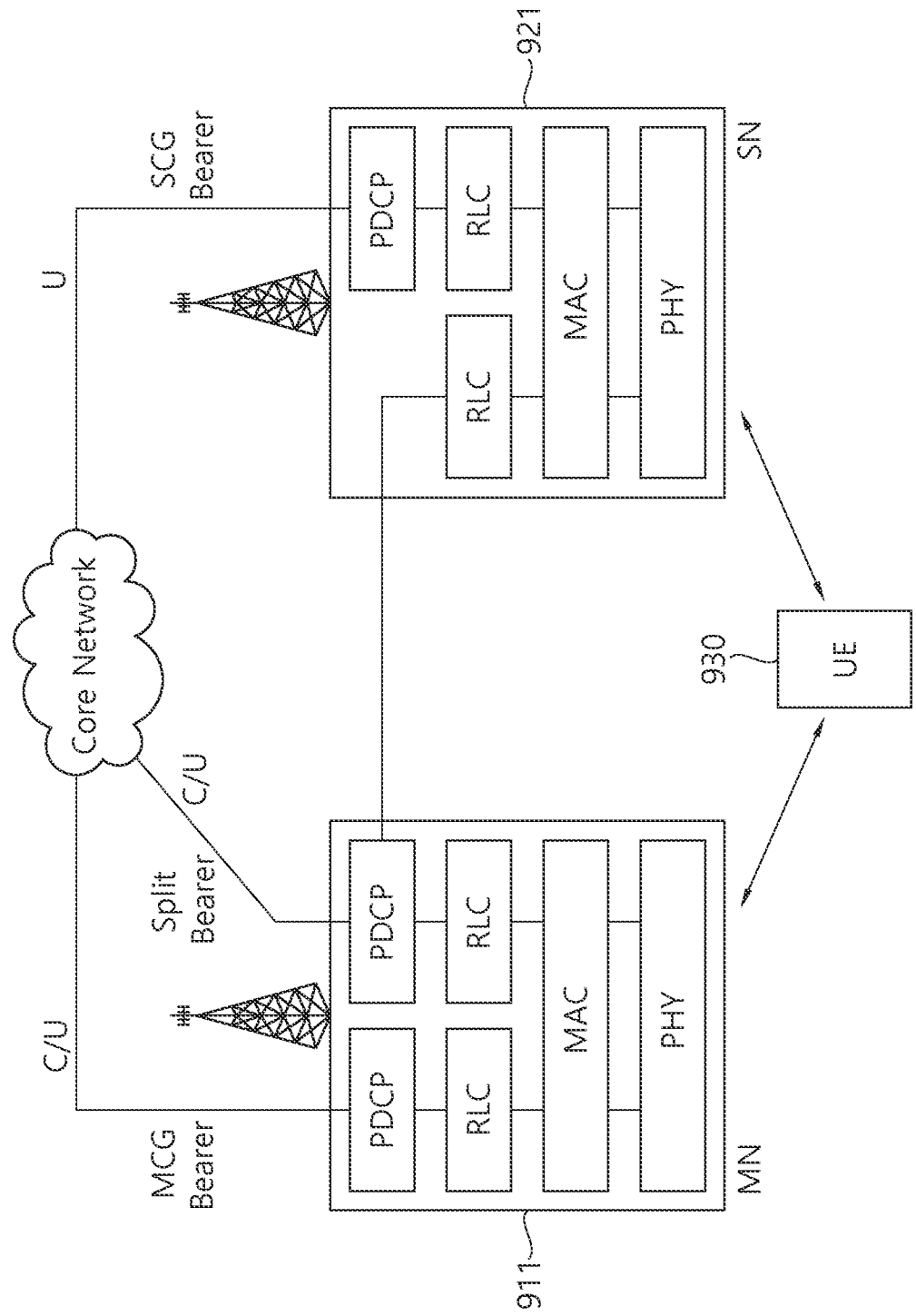
FIG. 9 shows an example of a dual connectivity (DC) architecture to which technical features of the present disclosure can be applied.

Further, in various embodiments, the constant N311 may be defined as maximum number of consecutive "in-sync" or "early-in-sync" indications for the PCell received from lower layers. FIG. 9 shows an example of a dual connectivity (DC) architecture to which technical features of the present disclosure can be applied.

Referring to FIG. 9, MN 911, SN 921, and a UE 930 communicating with both the MN 911 and the SN 921 are illustrated. As illustrated in FIG. 9, DC refers to a scheme in which a UE (e.g., UE 930) utilizes radio resources provided by at least two RAN nodes comprising a MN (e.g., MN 911) and one or more SNs (e.g., SN 921). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 911) refers to a main RAN node providing services to a UE in DC situation. SN (e.g., SN 921) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 9, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 9, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 9, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 9, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR—DC (EN-DC), and/or multi-radio access technology (RAT)—DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Figure 10:
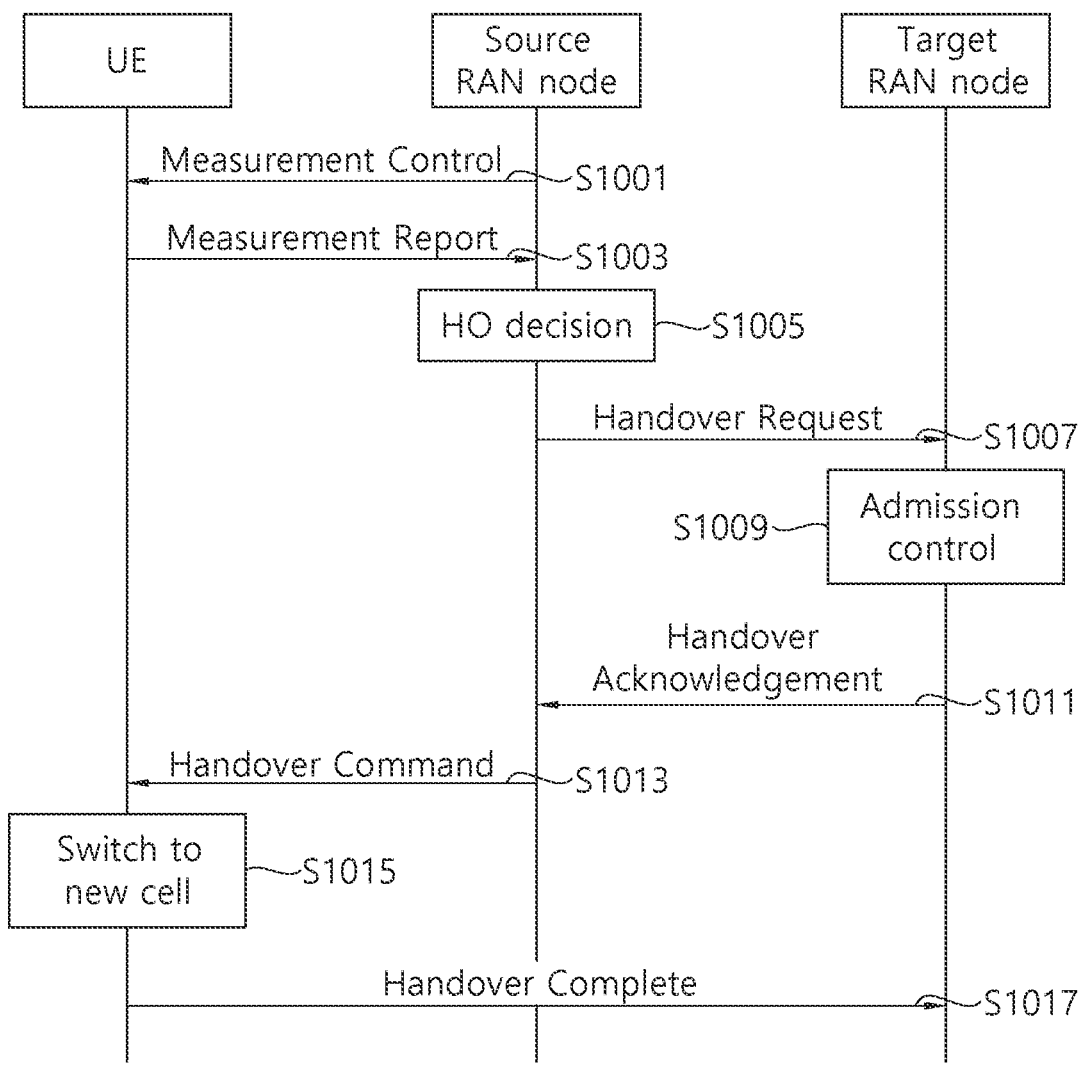
FIG. 10 shows an example of a handover procedure to which technical features of the present disclosure can be applied.

FIG. 10 shows an example of a handover procedure to which technical features of the present disclosure can be applied. FIG. 10 illustrates steps for the handover procedure exemplary, but the illustrated steps can also be applied to a mobility procedure (e.g., SN addition procedure and/or SN change procedure).

Referring to FIG. 10, in step S1001, the source RAN node may transmit measurement control message to the UE. The source RAN node may configure the UE measurement procedures according to the roaming and access restriction information and, for example, the available multiple frequency band information through the measurement control message. Measurement control information provided by the source RAN node through the measurement control message may assist the function controlling the UE's connection mobility. For example, the measurement control message may comprise measurement configuration and/or report configuration.

In step S1003, the UE may transmit a measurement report message to the source RAN node. The measurement report message may comprise a result of measurement on neighbor cell(s) around the UE which can be detected by the UE. The UE may generate the measurement report message according to a measurement configuration and/or measurement control information in the measurement control message received in step S1001.

In step S1005, the source RAN node may make a handover (HO) decision based on the measurement report. For example, the source RAN node may make a HO decision and determine a target RAN node for HO among neighbor cells around the UE based on a result of measurement (e.g., cell quality, signal quality, signal strength, reference signal received power (RSRP), reference signal received quality (RSRP), channel state, channel quality, signal to interference plus noise ratio (SINR)) on the neighbor cells.

In step S1007, the source RAN node may transmit a HO request message to the target RAN node which is determined in step S1005. That is, the source RAN node may perform handover preparation with the target RAN node. The HO request message may comprise necessary information to prepare the handover at the target RAN node.

In step S1009, the target RAN node may perform an admission control based on information included in the HO request message. The target RAN node may configure and reserve the required resources (e.g., C-RNTI and/or RACH preamble). The AS-configuration to be used in the target RAN node can either be specified independently (i.e. an "establishment") or as a delta compared to the AS-configuration used in the source RAN node (i.e. a "reconfiguration").

In step S1011, the target RAN node may transmit a HO request acknowledge (ACK) message to the source RAN node. The HO request ACK message may comprise information on resources reserved and prepared for a handover. For example, the HO request ACK message may comprise a transparent container to be sent to the UE as an RRC message to perform the handover. The container may include a new C-RNTI, target gNB security algorithm identifiers for the selected security algorithms, a dedicated RACH preamble, and/or possibly some other parameters i.e. access parameters, SIBs. If RACH-less handover is configured, the container may include timing adjustment indication and optionally a preallocated uplink grant. The HO request ACK message may also include RNL/TNL information for forwarding tunnels, if necessary. As soon as the source RAN node receives the HO request ACK message, or as soon as the transmission of the handover command is initiated in the downlink, data forwarding may be initiated.

In step S1013, the source RAN node may transmit a handover command which may be a RRC message, to the UE. The target RAN node may generate the RRC message to perform the handover, i.e. RRCConnectionReconfiguration message including the mobilityControlInformation, to be sent by the source RAN node towards the UE. The source RAN node may perform the necessary integrity protection and ciphering of the message. The UE may receive the RRCConnectionReconfiguration message with necessary parameters (i.e. new C-RNTI, target eNB security algorithm identifiers, and optionally dedicated RACH preamble, target eNB SIBS, etc.) and is commanded by the source eNB to perform the handover. If RACH-less handover is configured, the RRCConnectionReconfiguration may include timing adjustment indication and optionally preallocated uplink grant for accessing the target RAN node. If preallocated uplink grant is not included, the UE should monitor PDCCH of the target RAN node to receive an uplink grant. The UE may not need to delay the handover execution for delivering the HARQ/ARQ responses to source RAN node. If Make-Before-Break HO is configured, the connection to the source RAN node may be maintained after the reception of RRC-ConnectionReconfiguration message with mobilityControlInformation before the UE executes initial uplink transmission to the target RAN node.

In step S1015, the UE may switch to a new cell i.e., the target RAN node. The UE may detach from the old cell i.e., the source RAN node and synchronize to a new cell i.e., the target RAN node. For example, the UE may perform a random access to the target RAN node. The UE may transmit a random access preamble to the target RAN node, and receive a random access response comprising an uplink grant from the target RAN node. If RACH-less handover is configured, the step S1015 may be omitted, and the uplink grant may be provided in step S1013. The uplink grant may be used for the UE to transmit a handover complete message to the target RAN node.

In step S1017, the UE may transmit a handover complete message (i.e., RRCConnectionReconfigurationComplete message) to the target RAN node. When the UE has successfully accessed the target RAN node or received uplink grant when RACH-less HO is configured, the UE may send the RRCConnectionReconfigurationComplete message comprising a C-RNTI to confirm the handover, along with an uplink Buffer Status Report, whenever possible, to the target RAN node to indicate that the handover procedure is completed for the UE. The target RAN node may verify the C-RNTI sent in the RRCConnectionReconfigurationComplete message. The target RAN node can now begin sending data to the UE.

Figure 11:
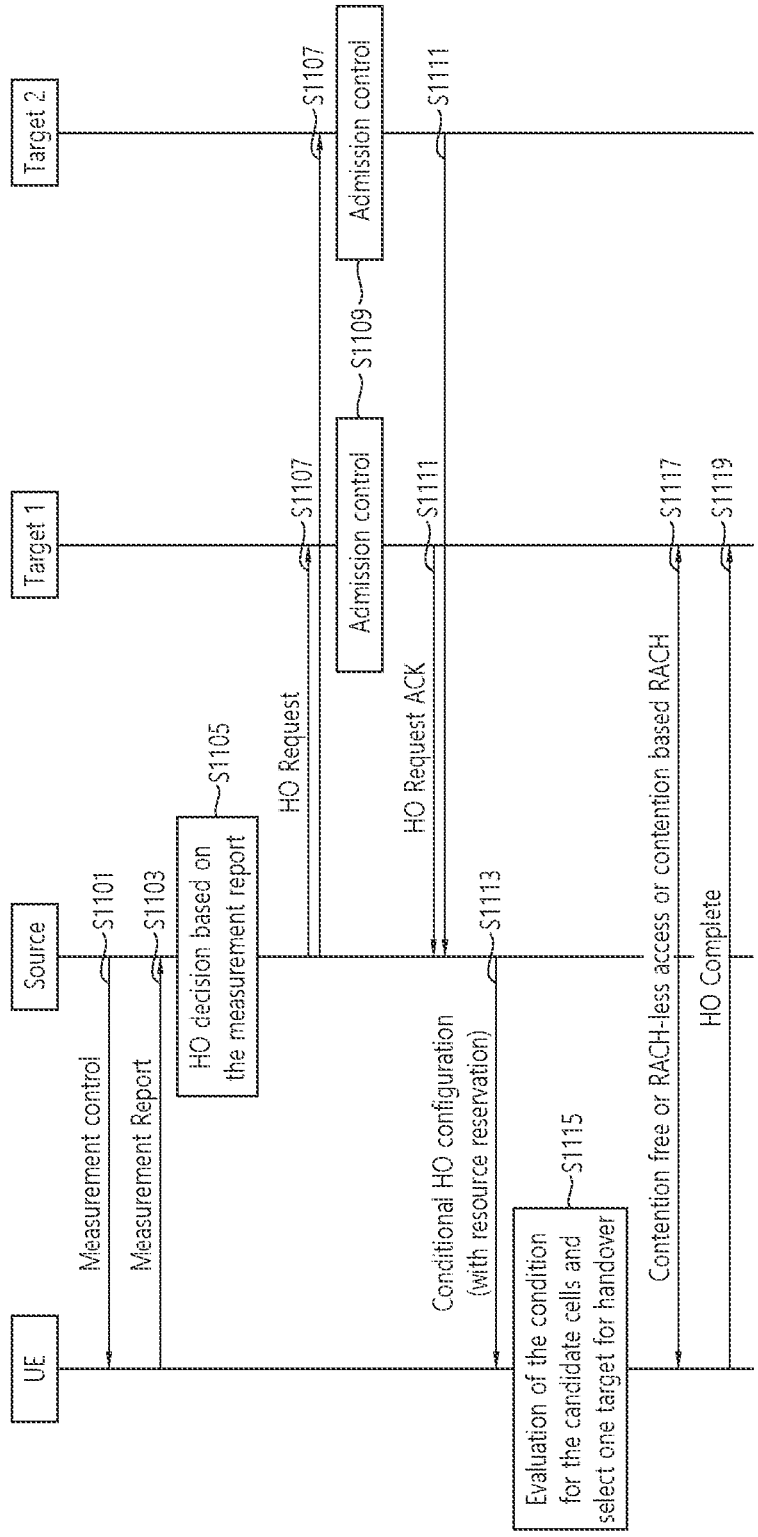
FIG. 11 shows an example of a conditional handover procedure to which technical features of the present disclosure can be applied.

FIG. 11 shows an example of a conditional handover procedure to which technical features of the present disclosure can be applied. FIG. 11 illustrates steps for the conditional handover procedure exemplary, but the illustrated steps can also be applied to a conditional mobility procedure (e.g., conditional SN addition procedure and/or conditional SN change procedure).

Referring to FIG. 11, in step S1101, the source RAN node may transmit measurement control message to the UE. The source RAN node may configure the UE measurement procedures according to the roaming and access restriction information and, for example, the available multiple frequency band information through the measurement control message. Measurement control information provided by the source RAN node through the measurement control message may assist the function controlling the UE's connection mobility. For example, the measurement control message may comprise measurement configuration and/or report configuration.

In step S1103, the UE may transmit a measurement report message to the source RAN node. The measurement report message may comprise a result of measurement on neighbor cell(s) around the UE which can be detected by the UE. The UE may generate the measurement report message according to a measurement configuration and/or measurement control information in the measurement control message received in step S1101.

In step S1105, the source RAN node may make a handover (HO) decision based on the measurement report. For example, the source RAN node may make a HO decision and determine candidate target RAN nodes (e.g., cell quality, signal quality, signal strength, reference signal received power (RSRP), reference signal received quality (RSRP), channel state, channel quality, signal to interference plus noise ratio (SINR)) on the neighbor cells.

In step S1107, the source RAN node may transmit HO request messages to the target RAN node 1 and the target RAN node 2 which are determined in step S1105. That is, the source RAN node may perform handover preparation with the target RAN node 1 and the target RAN node 2. The HO request message may comprise necessary information to prepare the handover at the target side (e.g., target RAN node 1 and target RAN node 2).

In step S1109, each of the target RAN node 1 and the target RAN node 2 may perform an admission control based on information included in the HO request message. The target RAN node may configure and reserve the required resources (e.g., C-RNTI and/or RACH preamble). The AS-configuration to be used in the target RAN node can either be specified independently (i.e. an "establishment") or as a delta compared to the AS-configuration used in the source RAN node (i.e. a "reconfiguration").

In step S1111, the target RAN node 1 and the target RAN node 2 may transmit a HO request acknowledge (ACK) message to the source RAN node. The HO request ACK message may comprise information on resources reserved and prepared for a handover. For example, the HO request ACK message may comprise a transparent container to be sent to the UE as an RRC message to perform the handover. The container may include a new C-RNTI, target gNB security algorithm identifiers for the selected security algorithms, a dedicated RACH preamble, and/or possibly some other parameters i.e. access parameters, SIBs. If RACH-less handover is configured, the container may include timing adjustment indication and optionally a preallocated uplink grant. The HO request ACK message may also include RNL/TNL information for forwarding tunnels, if necessary. As soon as the source RAN node receives the HO request ACK message, or as soon as the transmission of the handover command is initiated in the downlink, data forwarding may be initiated.

In step S1113, the source RAN node may transmit a conditional HO (CHO) configuration to the UE. The CHO configuration may be also referred to as conditional reconfiguration. The CHO configuration may comprise a CHO configuration for each of the candidate target RAN nodes (e.g., target RAN node 1, target RAN node 2). For example, the CHO configuration may comprise a CHO configuration for the target RAN node 1, and a CHO configuration for the target RAN node 2. The CHO configuration for the target RAN node 1 may comprise a handover condition for the target RAN node 1, and a handover command of the target RAN node 1. The handover command of the target RAN node 1 may comprise RRC reconfiguration parameters for a handover to the target RAN node 1, including information on resources reserved for the handover to the target RAN node 1. Similarly, the CHO configuration for the target RAN node 2 may comprise a handover condition for the target RAN node 2, and a handover command of the target RAN node 2. The handover command of the target RAN node 2 may comprise RRC reconfiguration parameters for a handover to the target RAN node 2, including information on resources reserved for the handover to the target RAN node 2.

In step S1115, the UE may perform an evaluation of the handover condition for the candidate target RAN nodes (e.g., target RAN node 1, target RAN node 2) and select a target RAN node for handover among the candidate target RAN nodes. For example, the UE may perform measurements on the candidate target RAN nodes, and determine whether a candidate target RAN node satisfies a handover condition for the candidate target RAN node among the candidate target RAN nodes based on a result of the measurements on the candidate target RAN nodes. If the UE identifies that the target RAN node 1 satisfies a handover condition for the target RAN node 1, the UE may select the target RAN node 1 as a target RAN node for the handover.

In step S1117, the UE may perform a random access to the selected target RAN node (e.g., target RAN node 1). For example, the UE may transmit a random access preamble to the target RAN node 1, and receive a random access response comprising an uplink grant from the target RAN node 1. If RACH-less handover is configured, the step S1117 may be omitted, and the uplink grant may be provided in step S1113. The uplink grant may be used for the UE to transmit a HO complete message to the target RAN node 1.

In step S1119, the UE may transmit a HO complete message to the target RAN node 1. When the UE has successfully accessed the target RAN node 1 (or, received uplink grant when RACH-less HO is configured), the UE may transmit a HO complete message comprising a C-RNTI to confirm the handover, along with uplink buffer status report, whenever possible, to the target RAN node 1 to indicate that the handover procedure is completed for the UE. The target RAN node 1 may verify the C-RNTI transmitted in the HO complete message.

Throughout the disclosure, descriptions related to a handover may also be applied to a mobility including not only the handover but also an SN addition and/or SN change.

Hereinafter, soft handover and/or dual active protocol stack (DAPS) handover is described.

Soft handover/handoff may refer to an ability to select between the instantaneous received signals from different RAN nodes (i.e., source RAN node and target RAN node). In the soft handover/handoff, the connection to the target RAN node may be established before the connection to the source RAN node is broken. Hence, the soft handover/handoff may also be called "make-before-break (MBB)" handover/handoff. The main advantage of the soft handover/handoff may be lowered probability of abnormal termination due to handover failure.

Also, DAPS handover refers to a handover based on DAPS in which both of the protocol stacks in a source RAN node and the protocol stacks in a target RAN node may be active during the handover. That is, in the DAPS and/or the DAPS handover, radio bearers and configuration of a source cell and a target cell may be maintained until the source cell is released after a handover complete.

Detailed definition/features of the DAPS handover will be described in conjunction with FIGS. 12 to 14.

Figure 12:
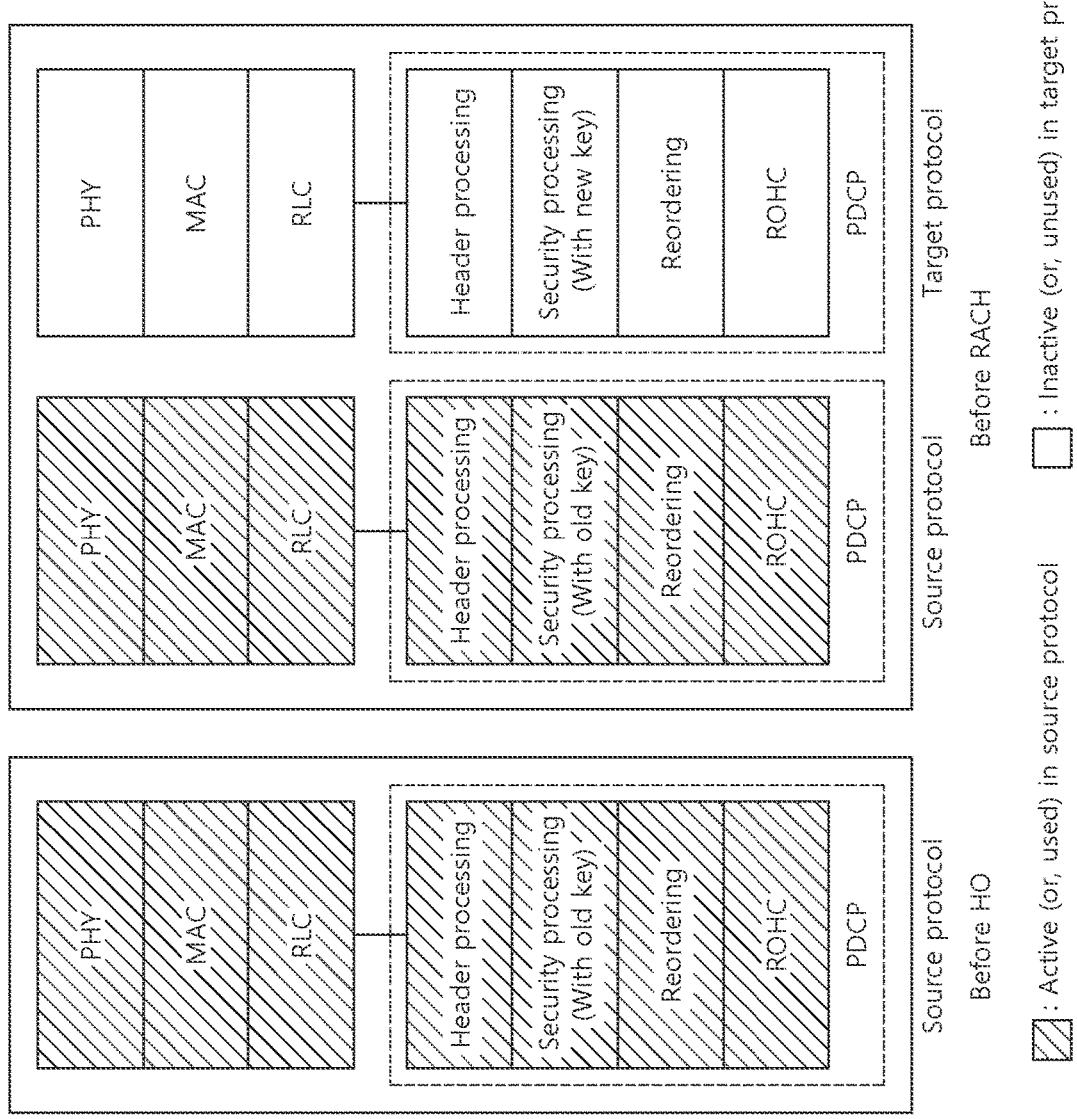
FIG. 12 shows an example of a state of source protocol and target protocol for a DAPS handover before initiating a handover and a random access to which technical features of the present disclosure can be applied.

FIG. 12 shows an example of a state of source protocol and target protocol for a DAPS handover before initiating a handover and a random access to which technical features of the present disclosure can be applied.

Referring to FIG. 12, before initiating a handover, only source protocol (i.e., protocol stacks in a source RAN node) and source key (i.e., key associated with the source RAN node) may be used. The source protocol may comprise at least one of PHY entity, MAC entity, RLC entity or PDCP entity.

Before initiating a random access, both the source protocol and a target protocol (i.e., protocol stacks in a target RAN node) may exist. The target protocol may comprise at least one of PHY entity, MAC entity, RLC entity or PDCP entity. Also, both of the source key and a target key (i.e., key associated with the target RAN node) may exist. However, only the source protocol and the source key may be used before initiating the random access when a UE has received a handover command.

Figure 13:
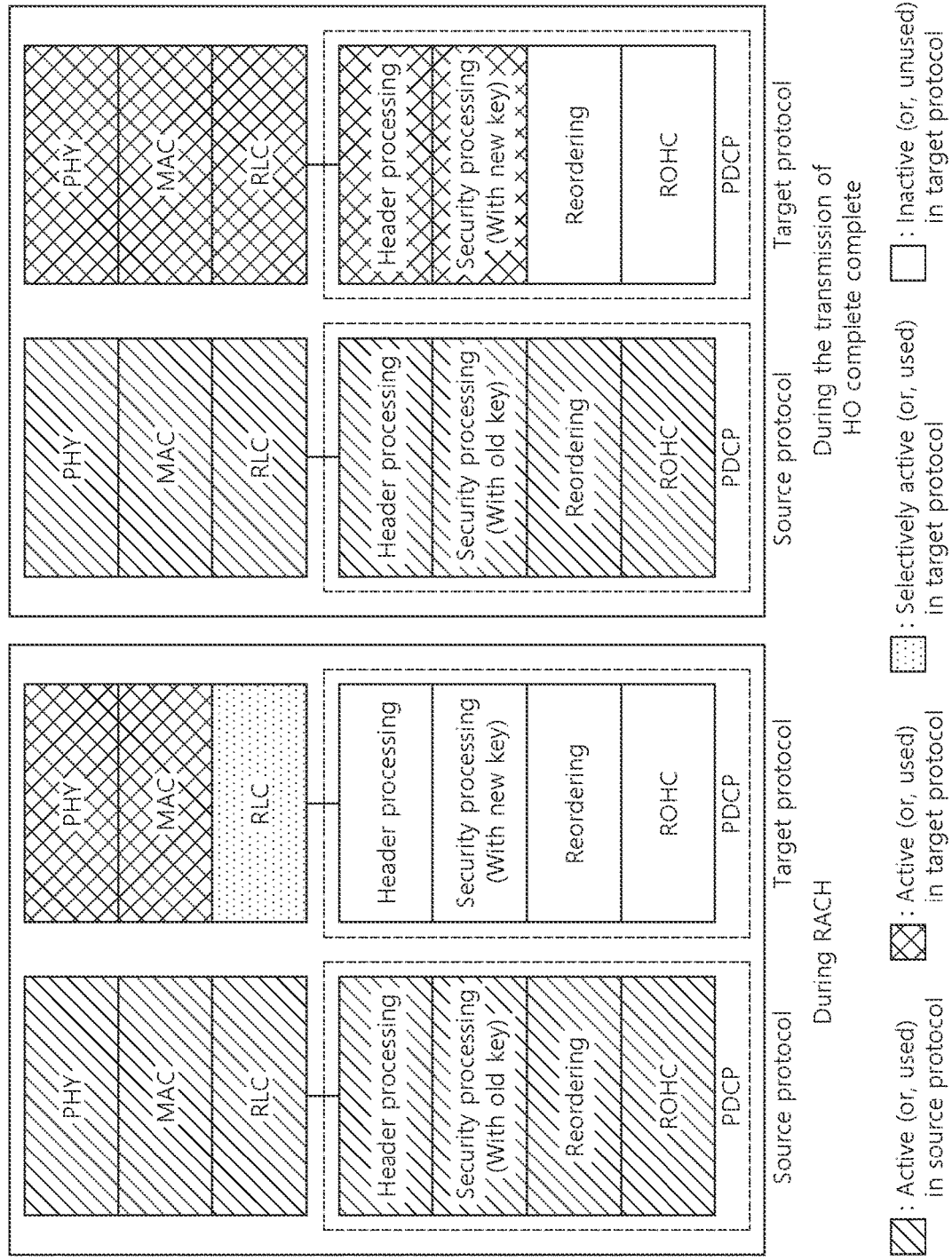
FIG. 13 shows an example of a state of source protocol and target protocol for a DAPS handover during a random access and a transmission of a handover complete message to which technical features of the present disclosure can be applied.

FIG. 13 shows an example of a state of source protocol and target protocol for a DAPS handover during a random access and a transmission of a handover complete message to which technical features of the present disclosure can be applied.

Referring to FIG. 13, during the random access, both of the source protocol and the target protocol may exist. Also, both of the source key and the target key may exist. The source protocol and the source key may be used to receive/transmit data from/to the source RAN node. PHY entity and MAC entity of the target protocol may be used to perform the random access procedure in the target RAN node. The RLC entity in the target protocol may be active for a contention-based random access procedure.

During the transmission of the handover complete message (i.e., RRCConnectionReconfigurationComplete message), both of the source protocol and the target protocol may exist. Also, both of the source key and the target key may exist. The source protocol and the source key may be used to receive/transmit data from/to the source RAN node. PHY entity, MAC entity and SRB PDCP entity of the target protocol may be used to perform the transmission of the RRCConnectionReconfigurationComplete message.

Figure 14:
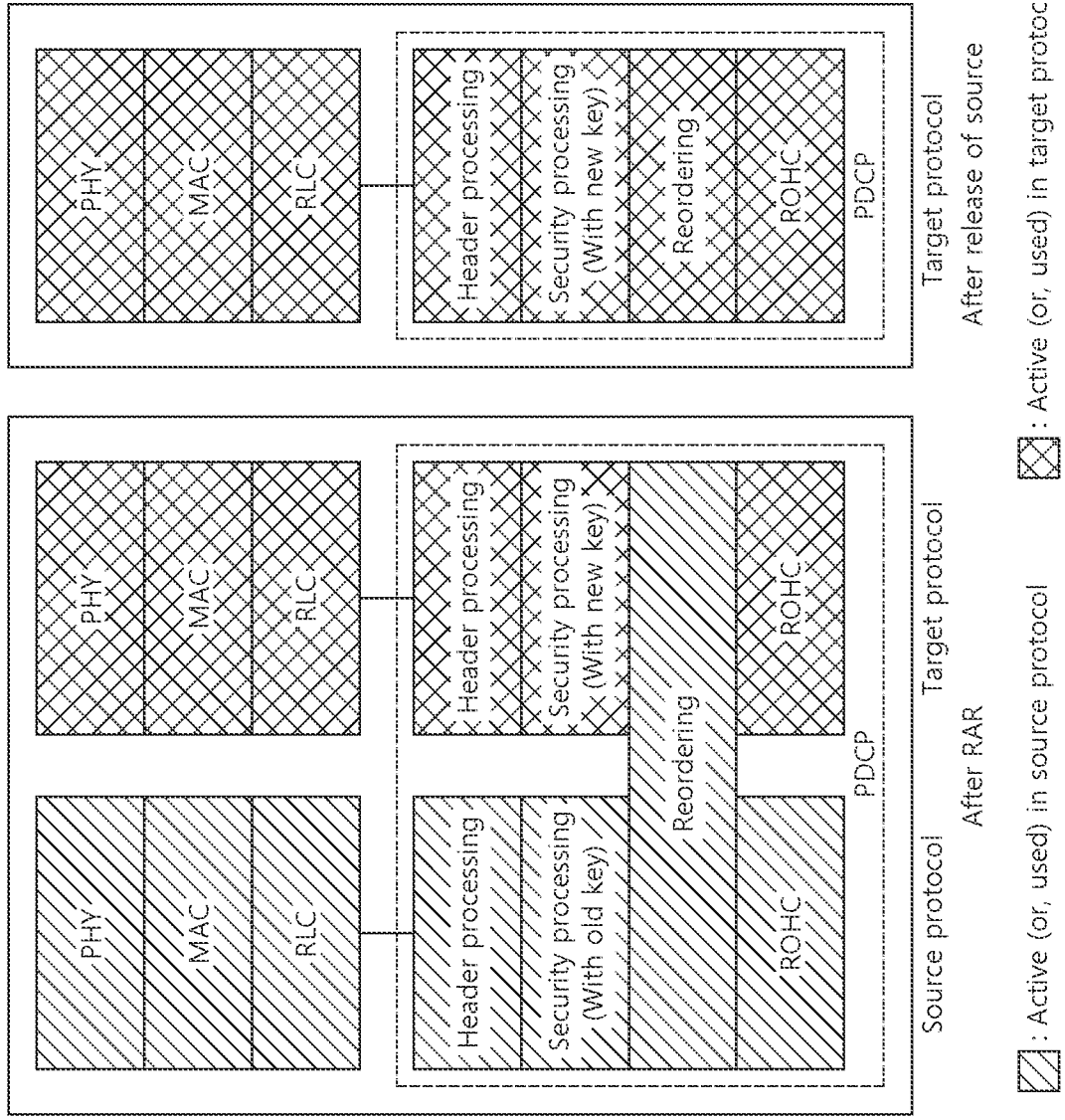
FIG. 14 shows an example of a state of source protocol and target protocol for a DAPS handover after RAR and a release of the source RAN node to which technical features of the present disclosure can be applied.

FIG. 14 shows an example of a state of source protocol and target protocol for a DAPS handover after RAR and a release of the source RAN node to which technical features of the present disclosure can be applied.

Referring to FIG. 14, after a UE performing the DAPS handover has received a random access response (RAR), both of the source protocol and the target protocol may exist. Also, both of the source key and the target key may exist. The source protocol and the source key may be used to receive/transmit data from/to the source RAN node. Further, target protocol and target key may be used to receive/transmit data from/to the target RAN node.

After a release of the source RAN node, the source protocol and the source key may have been deleted. Only the target protocol and the target key may be used.

Throughout the disclosure, the terms 'DAPS handover', 'soft handover/handoff' and 'MBB handover' can be used inter-changeably.

According to various embodiments, a UE may receive an RRCConnectionReconfiguration message including a configuration parameter "mobilityControlInfo". An example of the RRCConnectionReconfiguration message including mobilityControlInfo may be a handover command and/or a conditional handover command. If the UE received RRCConnectionReconfiguration message including mobilityControlInfo and the UE is able to comply with the configuration included in the RRCConnectionReconfiguration message, the UE shall start synchornising to a downlink of a target PCell. If a makeBeforeBreak (i.e., MBB) is configured, the UE may perform a handover procedure including resetting MAC entity after the UE has stopped the uplink transmission/downlink reception with the source cell(s). It may be up to UE implementation when to stop the uplink transmission/downlink reception with the source cell(s) to initiate re-tuning for connection to the target cell, if makeBeforeBreak is configured.

According to various embodiments, upon receiving N310 consecutive "out-of-sync" indications for the PCell while neither T300, T301, T304 nor T311 is running, the UE may start timer T310. Upon the T310 expiry, upon the T312 expiry, upon a random access problem indication from MCG MAC while neither T300, T301, T304 nor T311 is running, or upon indication from MCG RLC, which is allowed to be sent on PCell, that the maximum number of retransmissions has been reached for an SRB or DRB, the UE may consider a radio link failure (RLF) to be detected for the MCG.

According to various embodiments, the UE may initiate the RRC re-establishment procedure upon detecting the RLF of the MCG, and/or upon re-configuration with sync failure of the MCG.

Hereinafter, radio link monitoring (RLM) handling during MBB handover is described.

The UE may continue RLM on source cell connection even after receiving the MBB handover command, until a random access to the target cell is successful or the UE successfully receives a PDCCH transmission in case of RACH-less handover.

The UE may perform RLM only on target cell connection once the MBB handover execution to the target cell is successful. That is, the UE may perform RLM only on target cell connection once the random access to the target cell is successful or the UE successfully receives the PDCCH transmission in case of RACH-less handover.

When the RLF is detected on the target cell after successful HO completion and if the source cell connection is not yet released by the UE, then the UE may resume RLM on the source cell on fallback to the source cell connection.

Hereinafter, RLF handling during MBB handover is described.

On detecting an MBB handover failure (e.g., T304 expiry) or on detecting RLF on target cell connection (while the source cell connection is active) during the MBB handover, the UE may declare RLF on target cell connection but may not trigger RRC re-establishment and may operate using the source cell connection.

The UE may send RLF information to the source cell including an appropriate failure cause and any available measurement results on the target cell.

The UE may trigger RRC re-establishment during an MBB handover only when both the source cell connection and the target cell connection fail, due to RLF or MBB handover failure.

Hereinafter, radio resource management (RRM) measurement is described.

The RRM measurement may comprise channel quality indicator (CQI) measurement, reference signal received power (RSRP) measurement, reference signal received quality (RSRQ) measurement, and/or carrier received signal strength indicator (RSSI) measurement. A measurement of a channel quality represented by a signal to interference plus noise ratio (SINR) may be used for link adaption along with packet scheduling. The RSRP and/or the RSRQ may be needed for making a mobility decision during a mobility.

RRM of a cell (e.g., source cell and/or target cell) may comprise performing an RRM measurement on one or more neighbor cells for the cell based on a (measurement) configuration received from the cell, and/or reporting a result of the RRM measurement to the cell. For example, RRM of a source cell may comprise performing an RRM measurement on one or more neighbor cells for the source cell based on a (measurement) configuration received from the source cell (i.e., source cell configuration), and/or reporting a result of the RRM measurement to the source cell. The RRM of the source cell may also be referred to as source cell RRM handling, or simply source RRM handling.

As one of enhancements of MBB handover, DAPS solution is under discussion to achieve 0ms interruption time during a mobility. For the DAPS, radio bearers of source cell and target cell may be maintained until target cell may transmit RRC reconfiguration message to release source cell configuration. In order to achieve 0ms interruption time, the source cell may assign which DL data is rather transferred by the target cell while other DL/UL data are being transferred via the source cell during a handover, and the UE would receive/transmit DL/UL data from/to the target cell only and the target cell may indicate to the source cell that path can be switched from the source cell to the target cell after a handover complete.

In DAPS, a measurement handling (e.g., RRM/RLM handling) between the source cell and the target cell may be considered because multiple connections between the source cell and the target cell should be alive in the DAPS solution. However, it should be further considered how to start and/or end performing RLM/RRM of the source cell and/or the target cell. For example, the UE may revert back to source cell after MBB handover failure. In this case, it may be efficient for the UE to initiate another handover as soon as possible to avoid RLF and RRC re-establishment which cause data latency.

Therefore, it may be required for the UE to perform RRM measurement and/or send new measurement report after MBB handover failure. Also, it may be required to handle source cell RRM during a DAPS handover, as MBB enhancement.

Figure 15:
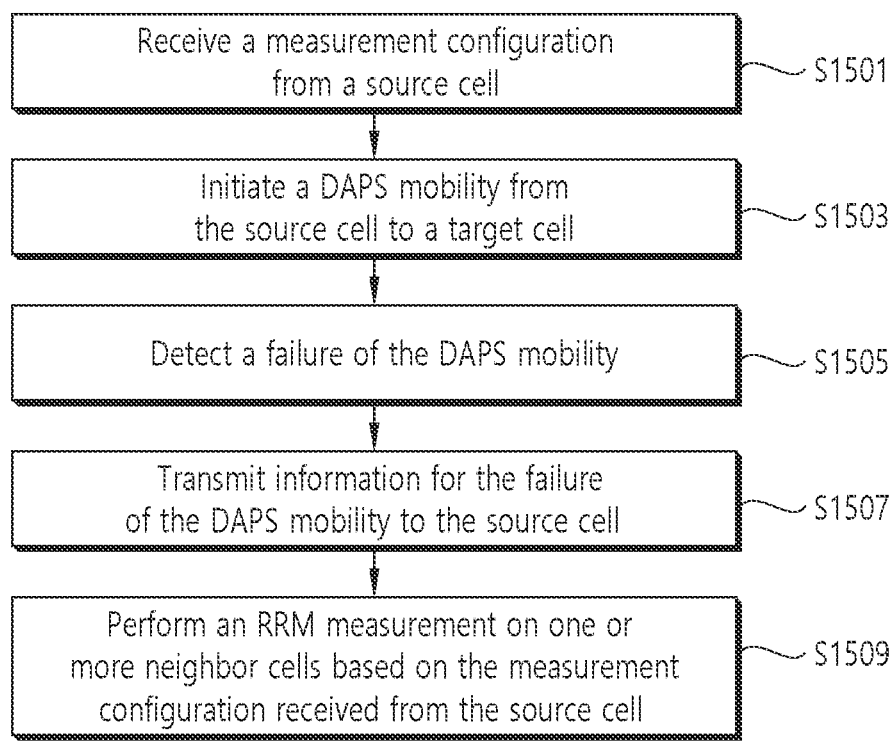
FIG. 15 shows an example of a method for a source RRM handling according to an embodiment of the present disclosure. Steps illustrated in FIG. 15 may be performed by a wireless device and/or a UE.

FIG. 15 shows an example of a method for a source RRM handling according to an embodiment of the present disclosure. Steps illustrated in FIG. 15 may be performed by a wireless device and/or a UE.

Referring to FIG. 15, in step S1501, the wireless device may receive a measurement configuration from a source cell. The measurement configuration may be a kind of a source cell configuration (i.e., configuration received from the source cell). The measurement configuration may comprise RRM configuration.

In step S1503, the wireless device may initiate a DAPS mobility from the source cell to a target cell. The wireless device may initiate the DAPS mobility in which a connection to both of the source cell and the target cell is maintained during a mobility procedure.

In step S1505, the wireless device may detect a failure of the DAPS mobility. For example, the wireless device may detect a failure of the DAPs mobility upon an expiry of a mobility validity timer such as T 304 and/or a reconfiguration error such as invalid configuration for the target cell.

In step S1507, the wireless device may transmit information for the failure of the DAPS mobility to the source cell. The wireless device may transmit information indicating that the DAPS mobility has failed, to the source cell.

In step S1509, the wireless device may perform an RRM measurement on one or more neighbor cells based on the measurement configuration received from the source cell. That is, the wireless device may revert back to the source cell and perform an RRM of the source cell. Throughout the disclosure, the wireless device reverting back to the source cell in a mobility procedure may refer to using a source cell configuration that is received before initiating the mobility procedure, after a mobility failure. Therefore, the wireless device may revert back to the source cell and perform an RRM of the source cell based on a source cell configuration that is received before initiating the DAPS mobility.

According to various embodiments, the wireless device may receive the measurement configuration from the source cell before initiating the DAPS mobility from the source cell to the target cell.

According to various embodiments, after/upon detecting the failure of the DAPS mobility, the wireless device may perform the RRM measurement without performing an RRC re-establishment.

According to various embodiments, the wireless device may perform an RRM measurement on a neighbor cell during the DAPS mobility. The wireless device may transmit, to the source cell after detecting the failure of the DAPS mobility, information for a result of the RRM measurement on the neighbor cell.

According to various embodiments, the neighbor cell may satisfy a report condition of the RRM measurement on the neighbor cell during the DAPS mobility. The information for the result of the RRM measurement on the neighbor cell may be stored in a memory of the wireless device without being transmitted to the source cell during the DAPS mobility.

According to various embodiments, the wireless device may receive, from the source cell, a mobility command for the target cell. The wireless device may initiate the DAPS mobility based on the mobility command. The measurement configuration may be received by the wireless device before the mobility command is received by the wireless device.

According to various embodiments, the wireless device may perform at least one of a downlink data reception or an uplink data transmission on the source cell after detecting the failure of the DAPS mobility.

According to various embodiments, the wireless device may identify, among the one or more neighbor cells, a neighbor cell satisfying a report condition of the RRM measurement. The wireless device may transmit, to the source cell, a measurement report comprising a result of the RRM measurement for the neighbor cell. The wireless device may receive, from the source cell, a mobility command for the neighbor cell. The wireless device may perform a mobility (e.g., DAPS mobility) to the neighbor cell as the target cell based on the mobility command. The wireless device may transmit a mobility complete message based on that the mobility to the target cell is successful.

According to various embodiments, the wireless device may perform an RLM on the source cell until transmitting the mobility complete message. The wireless device may perform an RLM on the target cell from a time the mobility complete message is transmitted.

According to various embodiments, after the mobility to the target cell is successful, the wireless device may perform an RRM measurement on neighbor cells (i.e., RRM of the target cell) based on a measurement configuration received from the target cell.

According to various embodiments, the wireless device may perform a mobility from a source cell to a target cell while maintaining a configuration of source cell (i.e., source cell configuration) including a measurement configuration of a source cell. The wireless device may perform a measurement (e.g., RRM measurement) based on the measurement configuration of the source cell. The wireless device may store measurement information obtain based on the RRM measurement, instead of reporting the measurement information to the source cell. The wireless device may report the measurement information to the source cell after detecting a failure of a mobility to the target cell.

Figure 16:
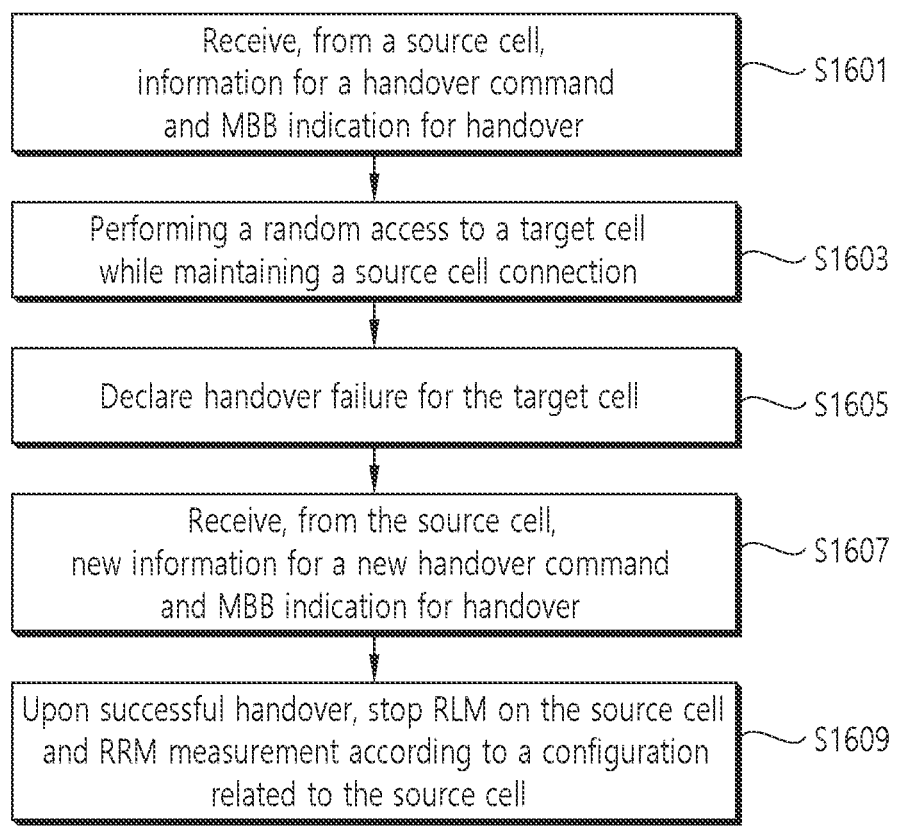
FIG. 16 shows an example of a method for source RRM handling in DAPS handover according to an embodiment of the present disclosure.

FIG. 16 shows an example of a method for source RRM handling in DAPS handover according to an embodiment of the present disclosure. Steps illustrated in FIG. 16 may be performed by a wireless device and/or a UE.

Referring to FIG. 16, in step S1601, the UE may receive, from a source cell, information about handover command and enhanced MBB indication (or, MBB handover indication/DAPS handover indication) for handover. The UE may maintain an RRM measurement configuration relevant to the source cell (i.e., source cell configuration) and also perform an RRM measurement during a handover. That is, the UE may have received the source cell configuration from the source cell before receiving the handover command from the source cell, which means that the UE may have received the source cell configuration from the source cell before initiating the handover. If additional neighbor cell satisfies a report condition of the RRM measurement (i.e., a condition that should be satisfied for triggering (a transmission of) a measurement report comprising a result of the RRM measurement) during handover, the UE may not report the measurement result to the source cell promptly. Instead, the UE may store the report information (i.e., measurement results).

The enhanced MBB indication may be used to perform operations related to DAPS handover in which radio bearers and a configuration of source cell (i.e., source cell configuration) and a configuration of a target cell (i.e., target cell configuration) are maintained until the source cell is released after handover complete. For DAPS handover, RLM of the source cell may be required until sending a handover complete message to the target cell and RLM of a target cell is required from the time of sending the handover complete message to the target cell.

In step S1603, the UE may try a random access to the target cell while maintaining a source cell connection. The target cell may response to the random access trial. The RAN node associated with the source cell may keep scheduling for UL/DL data. The UE may keep monitoring radio link of the source cell (i.e., perform RLM on the source cell while performing a random access to the target cell).

In step S1605, the UE may declare handover failure for the target cell. For example, the UE may declare the handover failure upon an expiry of a handover validity timer such as T304 and/or a reconfiguration error such as invalid configuration for the target cell. The UE may release whole target cell configuration. If there is no cell to perform measurement report (i.e., there is no cell satisfying a report condition of RRM measurement), the UE may keep the RRM measurement according to the configuration received from the source cell. That is, the UE may perform the RRM measurement based on the source cell configuration that is received before initiating the handover, after declaring the handover failure. If there is any information (e.g., measurement result) to report which was stored during the handover (i.e., a result of RRM measurement on a cell satisfying a report condition), the UE may send an RRC signalling for measurement report (e.g. MeasurementReport) to the source cell including all cells which are satisfying a report condition of the RRM measurement. The UE and the source cell also may keep performing UL/DL data transmission with the source cell.

In step S1607, the UE may receive, from the source cell, new information for a new handover command and MBB indication for handover. Upon receiving the measurement report message including new neighbouring cell satisfies a report condition, the source cell may provide new information for a handover command and enhanced MBB indication for handover.

In step S1609, upon successful handover, the UE may stop RLM on the source cell and RRM measurement according to a configuration related to the source cell (i.e., source cell configuration). The UE may release the source cell configuration including the measurement configuration of the source cell. The UE may start RLM on the target cell and perform RRM measurement according to the configuration relevant to the target cell (i.e., the configuration generated by and received from the target cell, which may be referred to as target cell configuration).

The RRC entity of the UE may declare a handover success if the UE receives, from lower layer, a lower layer acknowledgement for transmitted message indicating a mobility completion (e.g., handover complete message).

Hereinafter, source connectivity control for dual-connected mobility (e.g., DAPS mobility and/or MBB mobility) is described. The source connectivity control for dual-connected mobility may comprise i) RRC message transmission control, and ii) source cell connection control.

(1) RRC Message Transmission

Until mobility completion, the UE may send/receive source RRC messages on a source cell but may not send/receive source RRC messages on a target cell. However, it is also possible that until mobility completion, the UE may not only send/receive source RRC messages on a source cell but also send/receive source RRC message on a target cell. After mobility completion, the UE may not send/receive source RRC message. Further, after mobility completion, the UE may send/receive duplicate target RRC messages on a source cell, while the UE may send/receive target RRC messages on a target cell as normally.

(2) Source Cell Connection Control

A source cell may be able to provision conditions on holding/releasing a connectivity with a source cell for a duration prior to mobility completion. A target cell may be able to provision conditions on holding/releasing the connectivity with a source cell for a duration after mobility completion. A quality of a serving cell can be considered as conditions for a control on holding/releasing the connectivity with the source cell.

Hereinafter, detailed procedure for reverting back to a source cell configuration after a mobility failure is described.

For example, the UE shall:
1>if T304 of the MCG expires:
2>release dedicated preambles provided in rach-ConfigDedicated if configured;
2>if dapsConfig is configured for any DRB, and radio link failure is not detected in the source Pcell:
3>release target PCell configuration;
3>reset target MAC and release the target MAC configuration;
3>for each DRB with a DAPS PDCP entity:
4>release the RLC entity and the associated logical channel for the target;
4>reconfigure the PDCP entity to normal PDCP;
3>for each SRB:
4>if the masterKeyUpdate was not received:
5>configure the PDCP entity for the source with the same state variables as the PDCP entity for the target;
4>release the PDCP entity for the target;
4>release the RLC entity and the associated logical channel for the target;
3>release the physical channel configuration for the target;
3>revert back to the SDAP configuration used in the source;
3>discard the keys used in target (the $K_{gNB}$ key, the S-$K_{gNB}$ key, the S-$K_{eNB}$ key, the $K_{RRCenc}$ key, the $K_{RRCInt}$ key, the $K_{UPint}$ key and the $K_{UPenc}$ key), if any;
3>resume suspended SRBs in the source;
3>for each DRB without a DAPS PDCP entity:
4>revert back to the UE configuration used for the DRB in the source, includes PDCP, RLC states variables, the security configuration and the data stored in transmission and reception buffers in PDCP and RLC entities;
3>revert back to the UE RRM configuration used in the source;
3>initiate the failure information procedure to report DAPS handover failure.
2>else:
3>revert back to the UE configuration used in the source PCell;
3>initiate the connection re-establishment procedure.

In the context above, "the UE configuration" may include state variables and parameters of each radio bearer.
1>else if T304 of a secondary cell group expires:
2>release dedicated preambles provided in rach-ConfigDedicated, if configured;
2>initiate the SCG failure information procedure to report SCG reconfiguration with sync failure, upon which the RRC reconfiguration procedure ends;
1>else if T304 expires when RRCReconfiguration is received via other RAT (handover to NR failure):
2>reset MAC;
2>perform the actions defined for this failure case applicable for the other RAT.

For another example, the UE shall:
1>if the UE does not succeed in establishing the connection to the target radio access technology; or
1>if the UE is unable to comply with any part of the configuration included in the MobilityFromNRCommand message; or
1>if there is a protocol error in the inter RAT information included in the MobilityFromNRCommand message, causing the UE to fail the procedure according to the specifications applicable for the target RAT:
2>revert back to the configuration used in the source PCell;
2>initiate the connection re-establishment procedure.

In summary, upon DAPS handover failure, UE may revert back to the source cell configuration prior to a reception of the handover command (including RLC and PDCP state) for the DRB that is not configured with DAPS. For non-DAPS DRB, upon DAPS handover failure, the reverted PDCP/RLC state may include data stored in transmission and reception buffers of PDCP and RLC entities prior to the reception of the handover command. For non-DAPS DRB, upon DAPS handover failure, the reverted source cell configuration may also include SDAP (for NR) configuration and logical channel configuration. If data is reverted for non-DAPS DRBs in case of DAPS handover failure, the data stored in transmission and reception buffers should not be discarded.

Figure 17:
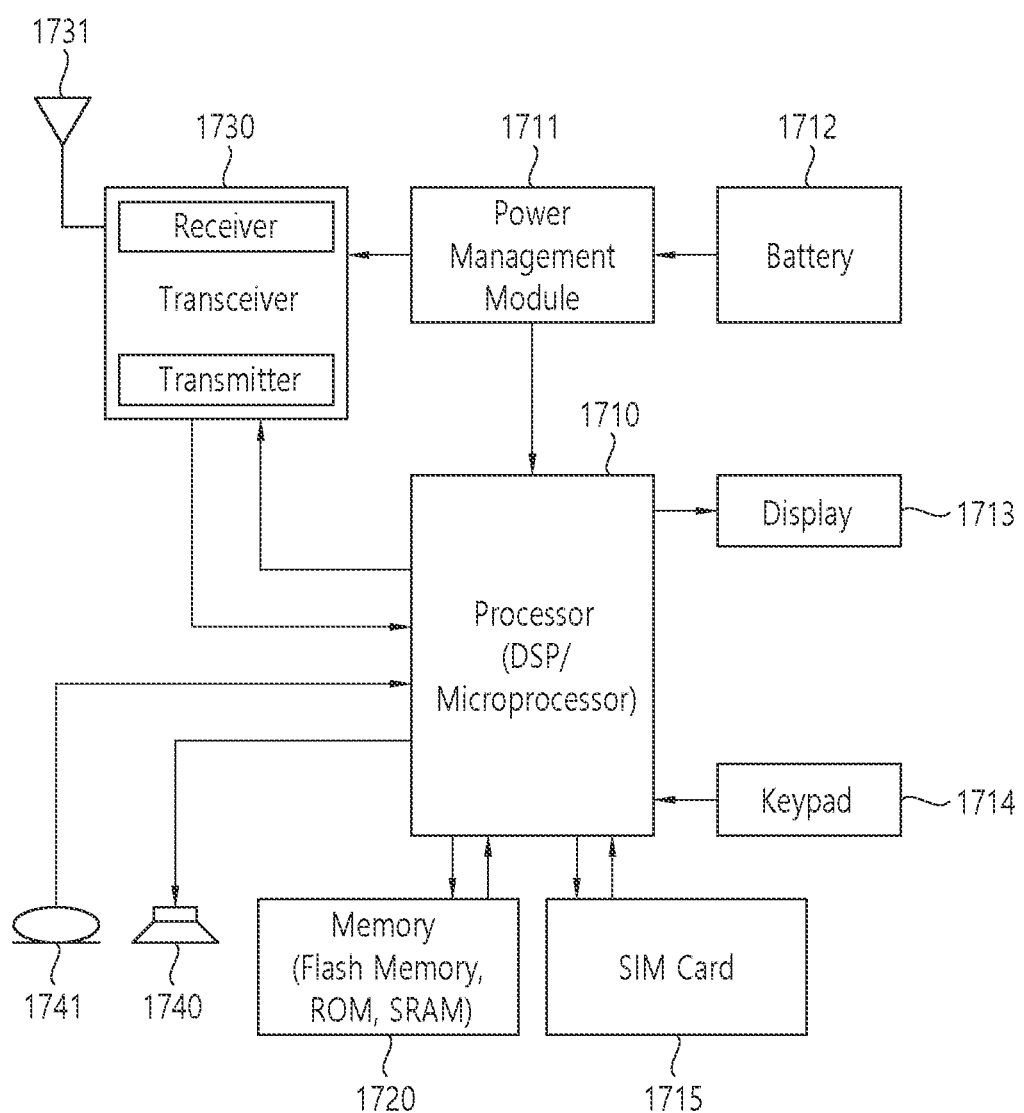
FIG. 17 shows a UE to implement an embodiment of the present disclosure.

FIG. 17 shows a UE to implement an embodiment of the present disclosure. The present disclosure described above for UE side may be applied to this embodiment.

A UE includes a processor 1710, a power management module 1711, a battery 1712, a display 1713, a keypad 1714, a subscriber identification module (SIM) card 1715, a memory 1720, a transceiver 1730, one or more antennas 1731, a speaker 1740, and a microphone 1741.

The processor 1710 may be configured to implement proposed functions, procedures and/or methods described in this description. Layers of the radio interface protocol may be implemented in the processor 1710. The processor 1710 may include application-specific integrated circuit (ASIC), other chipset, logic circuit and/or data processing device. The processor 1710 may be an application processor (AP). The processor 1710 may include at least one of a digital signal processor (DSP), a central processing unit (CPU), a graphics processing unit (GPU), a modem (modulator and demodulator). An example of the processor 1710 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1710 may be configured to, or configured to control the transceiver 1730 to implement steps performed by the UE and/or the wireless device throughout the disclosure.

The power management module 1711 manages power for the processor 1710 and/or the transceiver 1730. The battery 1712 supplies power to the power management module 1711. The display 1713 outputs results processed by the processor 1710. The keypad 1714 receives inputs to be used by the processor 1710. The keypad 1714 may be shown on the display 1713. The SIM card 1715 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1720 is operatively coupled with the processor 1710 and stores a variety of information to operate the processor 1710. The memory 1720 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1720 and executed by the processor 1710. The memory 1720 can be implemented within the processor 1710 or external to the processor 1710 in which case those can be communicatively coupled to the processor 1710 via various means as is known in the art.

The transceiver 1730 is operatively coupled with the processor 1710, and transmits and/or receives a radio signal. The transceiver 1730 includes a transmitter and a receiver. The transceiver 1730 may include baseband circuitry to process radio frequency signals. The transceiver 1730 controls the one or more antennas 1731 to transmit and/or receive a radio signal.

The speaker 1740 outputs sound-related results processed by the processor 1710. The microphone 1741 receives sound-related inputs to be used by the processor 1710.

Figure 18:
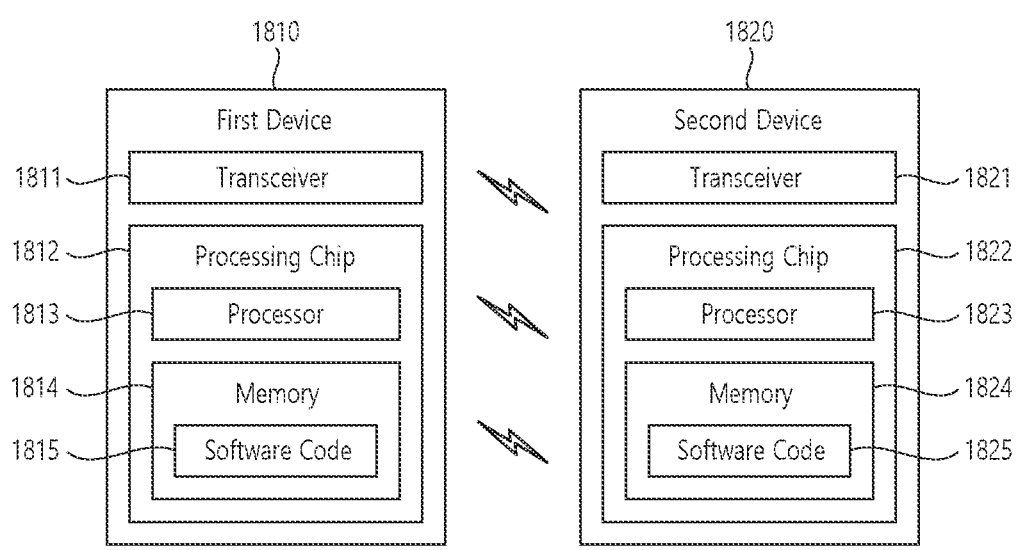
FIG. 18 shows another example of a wireless communication system to which the technical features of the present disclosure can be applied.

FIG. 18 shows another example of a wireless communication system to which the technical features of the present disclosure can be applied.

Referring to FIG. 18, the wireless communication system may include a first device 1810 (i.e., first device 210) and a second device 1820 (i.e., second device 220).

The first device 1810 may include at least one transceiver, such as a transceiver 1811, and at least one processing chip, such as a processing chip 1812. The processing chip 1812 may include at least one processor, such a processor 1813, and at least one memory, such as a memory 1814. The memory may be operably connectable to the processor 1813. The memory 1814 may store various types of information and/or instructions. The memory 1814 may store a software code 1815 which implements instructions that, when executed by the processor 1813, perform operations of the first device 910 described throughout the disclosure. For example, the software code 1815 may implement instructions that, when executed by the processor 1813, perform the functions, procedures, and/or methods of the first device 1810 described throughout the disclosure. For example, the software code 1815 may control the processor 1813 to perform one or more protocols. For example, the software code 1815 may control the processor 1813 to perform one or more layers of the radio interface protocol.

The second device 1820 may include at least one transceiver, such as a transceiver 1821, and at least one processing chip, such as a processing chip 1822. The processing chip 1822 may include at least one processor, such a processor 1823, and at least one memory, such as a memory 1824. The memory may be operably connectable to the processor 1823. The memory 1824 may store various types of information and/or instructions. The memory 1824 may store a software code 1825 which implements instructions that, when executed by the processor 1823, perform operations of the second device 1820 described throughout the disclosure. For example, the software code 1825 may implement instructions that, when executed by the processor 1823, perform the functions, procedures, and/or methods of the second device 1820 described throughout the disclosure. For example, the software code 1825 may control the processor 1823 to perform one or more protocols. For example, the software code 1825 may control the processor 1823 to perform one or more layers of the radio interface protocol.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 19:
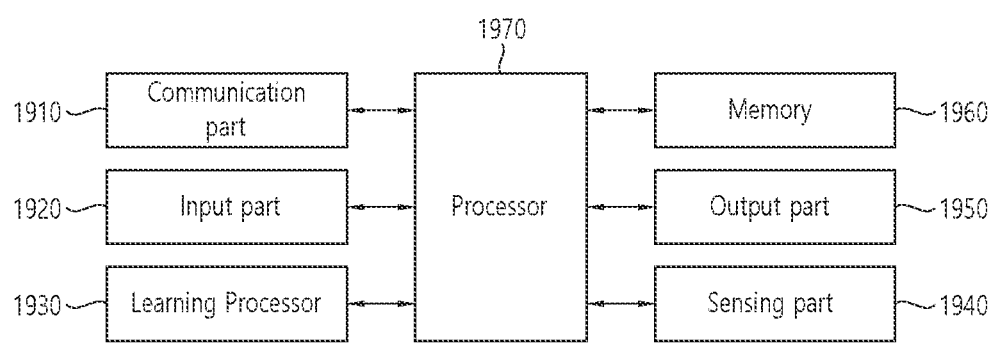
FIG. 19 shows an example of an AI device to which the technical features of the present disclosure can be applied.

FIG. 19 shows an example of an AI device to which the technical features of the present disclosure can be applied.

The AI device 1900 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 19, the AI device 1900 may include a communication part 1910, an input part 1920, a learning processor 1930, a sensing part 1940, an output part 1950, a memory 1960, and a processor 1970.

The communication part 1910 can transmit and/or receive data to and/or from external devices such as the AI devices and the AI server using wire and/or wireless communication technology. For example, the communication part 1910 can transmit and/or receive sensor information, a user input, a learning model, and a control signal with external devices. The communication technology used by the communication part 1910 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1920 can acquire various kinds of data. The input part 1920 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1920 can acquire input data to be used when acquiring an output using learning data and a learning model for model learning. The input part 1920 may obtain raw input data, in which case the processor 1970 or the learning processor 1930 may extract input features by preprocessing the input data.

The learning processor 1930 may learn a model composed of an ANN using learning data. The learned ANN can be referred to as a learning model. The learning model can be used to infer result values for new input data rather than learning data, and the inferred values can be used as a basis for determining which actions to perform. The learning processor 1930 may perform AI processing together with the learning processor of the AI server. The learning processor 1930 may include a memory integrated and/or implemented in the AI device 1900. Alternatively, the learning processor 1930 may be implemented using the memory 1960, an external memory directly coupled to the AI device 1900, and/or a memory maintained in an external device.

The sensing part 1940 may acquire at least one of internal information of the AI device 1900, environment information of the AI device 1900, and/or the user information using various sensors. The sensors included in the sensing part 1940 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1950 may generate an output related to visual, auditory, tactile, etc. The output part 1950 may include a display unit for outputting visual information, a speaker for outputting auditory information, and/or a haptic module for outputting tactile information.

The memory 1960 may store data that supports various functions of the AI device 1900. For example, the memory 1960 may store input data acquired by the input part 1920, learning data, a learning model, a learning history, etc.

The processor 1970 may determine at least one executable operation of the AI device 1900 based on information determined and/or generated using a data analysis algorithm and/or a machine learning algorithm. The processor 1970 may then control the components of the AI device 1900 to perform the determined operation. The processor 1970 may request, retrieve, receive, and/or utilize data in the learning processor 1930 and/or the memory 1960, and may control the components of the AI device 1900 to execute the predicted operation and/or the operation determined to be desirable among the at least one executable operation. The processor 1970 may generate a control signal for controlling the external device, and may transmit the generated control signal to the external device, when the external device needs to be linked to perform the determined operation. The processor 1970 may obtain the intention information for the user input and determine the user's requirements based on the obtained intention information. The processor 1970 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1930 and/or learned by the learning processor of the AI server, and/or learned by their distributed processing. The processor 1970 may collect history information including the operation contents of the AI device 1900 and/or the user's feedback on the operation, etc. The processor 1970 may store the collected history information in the memory 1960 and/or the learning processor 1930, and/or transmit to an external device such as the AI server. The collected history information can be used to update the learning model. The processor 1970 may control at least some of the components of AI device 1900 to drive an application program stored in memory 1960. Furthermore, the processor 1970 may operate two or more of the components included in the AI device 1900 in combination with each other for driving the application program.

Figure 20:
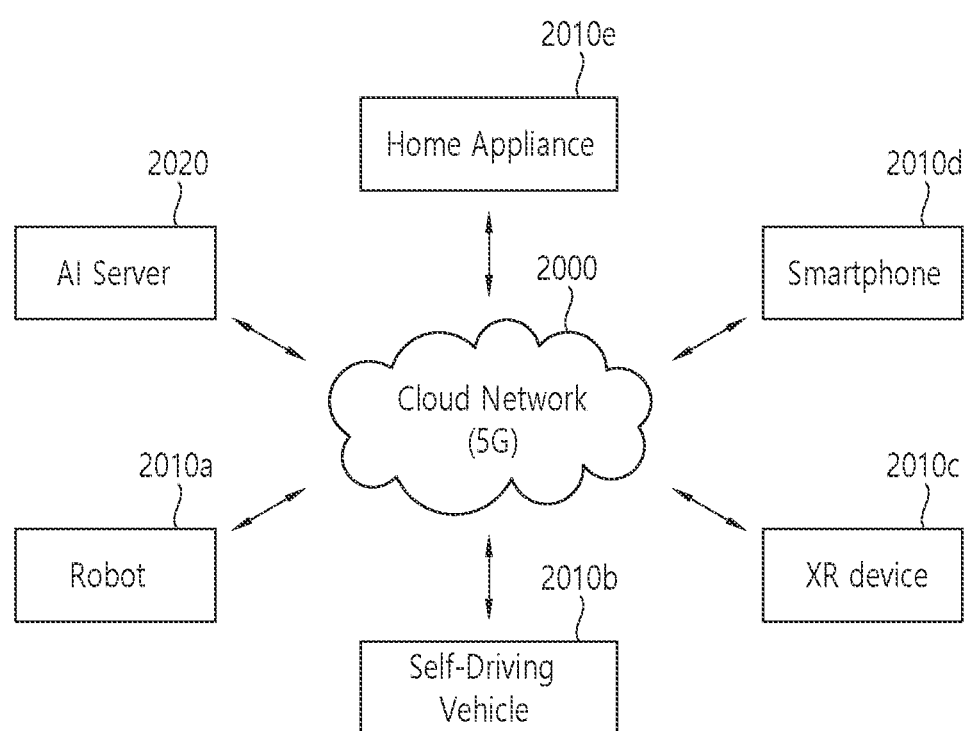
FIG. 20 shows an example of an AI system to which the technical features of the present disclosure can be applied.

FIG. 20 shows an example of an AI system to which the technical features of the present disclosure can be applied.

Referring to FIG. 20, in the AI system, at least one of an AI server 2020, a robot 2010*a*, an autonomous vehicle 2010*b*, an XR device 2010*c*, a smartphone 2010*d* and/or a home appliance 2010*e* is connected to a cloud network 2000. The robot 2010*a*, the autonomous vehicle 2010*b*, the XR device 2010*c*, the smartphone 2010*d*, and/or the home appliance 2010*e* to which the AI technology is applied may be referred to as AI devices 2010*a* to 2010*e*.

The cloud network 2000 may refer to a network that forms part of a cloud computing infrastructure and/or resides in a cloud computing infrastructure. The cloud network 2000 may be configured using a 3G network, a 4G or LTE network, and/or a 5G network. That is, each of the devices 2010*a* to 2010*e* and 2020 consisting the AI system may be connected to each other through the cloud network 2000. In particular, each of the devices 2010*a* to 2010*e* and 2020 may communicate with each other through a base station, but may directly communicate with each other without using a base station.

The AI server 2020 may include a server for performing AI processing and a server for performing operations on big data. The AI server 2020 is connected to at least one or more of AI devices constituting the AI system, i.e. the robot 2010*a*, the autonomous vehicle 2010*b*, the XR device 2010*c*, the smartphone 2010*d* and/or the home appliance 2010*e* through the cloud network 2000, and may assist at least some AI processing of the connected AI devices 2010*a* to 2010*e*. The AI server 2020 can learn the ANN according to the machine learning algorithm on behalf of the AI devices 2010*a* to 2010*e*, and can directly store the learning models and/or transmit them to the AI devices 2010*a* to 2010*e*. The AI server 2020 may receive the input data from the AI devices 2010*a* to 2010*e*, infer the result value with respect to the received input data using the learning model, generate a response and/or a control command based on the inferred result value, and transmit the generated data to the AI devices 2010*a* to 2010*e*. Alternatively, the AI devices 2010*a* to 2010*e* may directly infer a result value for the input data using a learning model, and generate a response and/or a control command based on the inferred result value.

Various embodiments of the AI devices 2010*a* to 2010*e* to which the technical features of the present disclosure can be applied will be described. The AI devices 2010*a* to 2010*e* shown in FIG. 20 can be seen as specific embodiments of the AI device 1900 shown in FIG. 19.

The present disclosure can have various advantageous effects.

For example, the UE may perform an RRM measurement on one or more neighbor cells after a handover failure based on a source cell configuration so that a new handover can be initiated quickly. Since performing RRM of a source cell after the handover failure may prevent RRC re-establishment procedure and the UE may be able to keep sending data transmission to the source cell, interruption time can be further reduced.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
    receiving, from a source cell, a measurement configuration;
    receiving a handover command for a dual active protocol stack (DAPS) handover to a target cell;
    triggering the DAPS handover to the target cell based on the handover command, while maintaining configurations of the source cell until release of the source cell;
    detecting a failure of the DAPS handover to the target cell; and
    after detecting the failure of the DAPS handover:
        obtaining measurement results for one or more neighbor cells based on the measurement configuration received from the source cell, and
        transmitting, to the source cell, a measurement report comprising the measurement results for the one or more neighbor cells based on a condition for transferring the measurement results being satisfied.

2. The method of claim 1, wherein the receiving of the measurement configuration comprises receiving the measurement configuration from the source cell before triggering the DAPS handover to the target cell.

3. The method of claim 1, wherein the obtaining of the measurement results comprises obtaining the measurement results without performing a radio resource control (RRC) re-establishment.

4. The method of claim 1, wherein the obtaining of the measurement results comprises:
    reverting back to the source cell; and
    performing a radio resource management (RRM) measurement in a state the wireless device reverts back to the source cell.

5. The method of claim 1,
wherein the measurement configuration is received by the wireless device before the handover command is received by the wireless device.

6. The method of claim 1, further comprising:
performing at least one of a downlink data reception or an uplink data transmission on the source cell after detecting the failure of the DAPS handover.

7. The method of claim 1, further comprising:
receiving, from the source cell, a handover command for a neighbor cell;
performing a handover to the neighbor cell as the target cell; and
transmitting a handover complete message based on the handover to the neighbor cell being successful.

8. The method of claim 7, further comprising:
performing a radio link monitoring (RLM) on the source cell until transmitting the handover complete message.

9. The method of claim 7, further comprising:
performing a radio link monitoring (RLM) on the target cell from a time the handover complete message is transmitted.

10. The method of claim 7, further comprising:
after the handover to the neighbor cell is successful, performing a radio resource management (RRM) measurement based on a measurement configuration received from the neighbor cell.

11. The method of claim 1, wherein the wireless device is in communication with at least one of a user equipment, a network, or autonomous vehicles other than the wireless device.

12. A wireless device configured to operate in a wireless communication system comprising:
a transceiver;
a memory storing instructions; and
at least one processor operatively coupled to the transceiver and the memory, and configured to execute the instructions to perform operations comprising:
receiving, from a source cell, a measurement configuration;
receiving a handover command for a dual active protocol stack (DAPS) handover to a target cell;
triggering the DAPS handover to the target cell based on the handover command, while maintaining configurations of the source cell until release of the source cell;
detecting a failure of the DAPS, handover to the target cell; and
after detecting the failure of the DAPS handover:
obtaining measurement results for one or more neighbor cells based on the measurement configuration received from the source cell, and
transmitting, to the source cell, a measurement report comprising the measurement results for the one or more neighbor cells based on a condition for transferring the measurement results being satisfied.

13. A processor for a wireless device in a wireless communication system, wherein the processor is configured to control the wireless device to perform operations comprising:
receiving, from a source cell, a measurement configuration;
receiving a handover command for a dual active protocol stack (DAPS) handover to a target cell;
triggering the DAPS handover to the target cell based on the handover command, while maintaining configurations of the source cell until release of the source cell;
detecting a failure of the DAPS handover to the target cell; and
after detecting the failure of the DAPS mobility handover:
obtaining measurement results for one or more neighbor cells based on the measurement configuration received from the source cell, and
transmitting, to the source cell, a measurement report comprising the measurement results for the one or more neighbor cells based on a condition for transferring the measurement results being satisfied.

* * * * *